United States Patent
Gintz et al.

(10) Patent No.: US 10,621,796 B2
(45) Date of Patent: Apr. 14, 2020

(54) SYSTEM AND METHOD FOR REAL TIME WIRELESS ECU MONITORING AND REPROGRAMMING

(71) Applicant: EZ Lynk SEZC, Grand Cayman (KY)

(72) Inventors: Brad Gintz, Grand Cayman (KY); Thomas Wood, Grand Cayman (KY)

(73) Assignee: EZ Lynk SEZC, Grand Cayman (KY)

( * ) Notice: Subject to any disclaimer, the term of this patent is extended or adjusted under 35 U.S.C. 154(b) by 96 days.

(21) Appl. No.: 15/228,926

(22) Filed: Aug. 4, 2016

(65) Prior Publication Data

US 2017/0039059 A1 Feb. 9, 2017

Related U.S. Application Data

(60) Provisional application No. 62/201,462, filed on Aug. 5, 2015.

(51) Int. Cl.
| | |
|---|---|
| *H04W 4/48* | (2018.01) |
| *H04W 4/80* | (2018.01) |
| *H04W 4/40* | (2018.01) |
| *G06F 8/65* | (2018.01) |
| *G07C 5/00* | (2006.01) |
| *H04L 29/08* | (2006.01) |
| *G07C 5/08* | (2006.01) |

(52) U.S. Cl.
CPC ............... *G07C 5/008* (2013.01); *G06F 8/65* (2013.01); *G07C 5/085* (2013.01); *G07C 5/0841* (2013.01); *H04L 67/12* (2013.01); *H04W 4/40* (2018.02); *H04W 4/48* (2018.02); *H04W 4/80* (2018.02)

(58) Field of Classification Search
None
See application file for complete search history.

(56) References Cited

U.S. PATENT DOCUMENTS

| | | |
|---|---|---|
| 6,636,790 B1 | 10/2003 | Lightner et al. |
| 6,732,031 B1 | 5/2004 | Lightner et al. |
| 6,732,032 B1 | 5/2004 | Banet et al. |
| 6,738,697 B2 | 5/2004 | Breed |
| 6,745,151 B2 | 6/2004 | Marko et al. |
| 6,879,894 B1 | 4/2005 | Lightner et al. |
| 6,928,348 B1 | 8/2005 | Lightner et al. |
| 7,050,897 B2 | 5/2006 | Breed et al. |
| 7,082,359 B2 | 7/2006 | Breed |
| 7,162,339 B2 | 1/2007 | Nguyen |
| 7,225,065 B1 | 5/2007 | Hunt et al. |
| 7,228,211 B1 | 6/2007 | Lowrey et al. |
| 7,363,129 B1 | 4/2008 | Barnicle et al. |

(Continued)

*Primary Examiner* — Sargon N Nano
*Assistant Examiner* — Christopher B Robinson
(74) *Attorney, Agent, or Firm* — Schultz & Associates, P.C.

(57) ABSTRACT

Disclosed are methods, systems, and apparatus for managing firmware, settings, and parameters of an automotive controller using a local device, a client device, and a system server. The local device is connected to the automotive controller and is wirelessly connected to the client device. The client device is connected to the system server. The client device receives engine data from the local device that receives the engine data from the automotive controller and the client device sends the engine data to the server system. Firmware, settings, and parameter updates are selected with the client device, sent to the local device, and then sent to the automotive controller.

22 Claims, 33 Drawing Sheets

(56) References Cited

U.S. PATENT DOCUMENTS

| | | |
|---|---|---|
| 7,421,321 B2 | 9/2008 | Breed et al. |
| 7,447,574 B1 | 11/2008 | Washicko et al. |
| 7,480,551 B1 | 1/2009 | Lowrey et al. |
| 7,554,441 B2 | 6/2009 | Viegers et al. |
| 7,620,484 B1 | 11/2009 | Chen |
| 7,629,876 B2 | 12/2009 | Nagai et al. |
| 7,630,801 B2 | 12/2009 | Giles et al. |
| 7,650,210 B2 | 1/2010 | Breed |
| 7,747,365 B1 | 6/2010 | Lowrey et al. |
| 7,792,618 B2 | 9/2010 | Quigley et al. |
| 7,904,219 B1 | 3/2011 | Lowrey et al. |
| 7,917,253 B2 | 3/2011 | Inbarajan et al. |
| 8,014,789 B2 | 9/2011 | Breed |
| 8,019,501 B2 | 9/2011 | Breed |
| 8,024,084 B2 | 9/2011 | Breed |
| 8,035,508 B2 | 10/2011 | Breed |
| 8,036,788 B2 | 10/2011 | Breed |
| 8,055,403 B2 | 11/2011 | Lowrey et al. |
| 8,108,231 B2 | 1/2012 | Belanger et al. |
| 8,406,951 B2 | 3/2013 | Suganuma et al. |
| 8,447,459 B2 | 5/2013 | Lowrey et al. |
| 8,527,135 B2 | 9/2013 | Lowrey et al. |
| 8,559,937 B2 | 10/2013 | Ram et al. |
| 8,781,442 B1 | 7/2014 | Link, II |
| 8,825,271 B2 | 9/2014 | Chen |
| 8,855,621 B2 | 10/2014 | Chen |
| 8,914,187 B2 | 12/2014 | Wang et al. |
| 9,002,554 B2 | 4/2015 | Chen |
| 9,014,908 B2 | 4/2015 | Chen et al. |
| 9,031,710 B2 | 5/2015 | Barrett |
| 9,050,862 B2 | 6/2015 | Mouchet |
| 9,083,581 B1 | 7/2015 | Addepalli et al. |
| 9,120,357 B2 | 9/2015 | Deniau et al. |
| 9,126,483 B2 | 9/2015 | Aoki et al. |
| 9,135,759 B2 | 9/2015 | Baer et al. |
| 9,141,503 B1 | 9/2015 | Chen |
| 9,142,065 B2 | 9/2015 | Rude et al. |
| 9,142,066 B2 | 9/2015 | Chen et al. |
| 9,224,249 B2 | 12/2015 | Lowery et al. |
| 9,224,251 B2 | 12/2015 | Harata et al. |
| 9,233,655 B2 | 1/2016 | Barrett |
| 9,248,807 B2 | 2/2016 | Lee et al. |
| 9,269,169 B2 | 2/2016 | Morimoto et al. |
| 9,280,859 B2 | 3/2016 | Itatsu et al. |
| 9,286,264 B2 | 3/2016 | Johnson et al. |
| 9,292,984 B2 | 3/2016 | Kitahara et al. |
| 9,324,195 B2 | 4/2016 | Koenig et al. |
| 9,342,934 B2 | 5/2016 | Chen |
| 9,418,492 B2 | 8/2016 | Sinner et al. |
| 9,483,884 B2 | 11/2016 | Chen et al. |
| 9,489,544 B2 | 11/2016 | Naitou et al. |
| 9,747,254 B2 | 8/2017 | McQuade et al. |
| 2002/0007237 A1* | 1/2002 | Phung ............... G05B 23/0216 701/31.4 |
| 2003/0187556 A1 | 10/2003 | Suzuki |
| 2004/0111505 A1 | 6/2004 | Callahan et al. |
| 2005/0256614 A1* | 11/2005 | Habermas ............ B60L 3/0023 701/1 |
| 2006/0129691 A1 | 6/2006 | Coffee et al. |
| 2009/0178986 A1 | 7/2009 | Coglitore et al. |
| 2009/0318121 A1 | 12/2009 | Marumoto |
| 2010/0070107 A1* | 3/2010 | Berkobin .............. G07C 5/008 701/1 |
| 2010/0292890 A1* | 11/2010 | Morris .................. G07C 5/008 701/31.4 |
| 2012/0136827 A1 | 5/2012 | Wang et al. |
| 2012/0288016 A1 | 11/2012 | Ichikawa |
| 2013/0212659 A1 | 8/2013 | Maher et al. |
| 2013/0246135 A1* | 9/2013 | Wang .................... G07C 5/008 705/14.4 |
| 2013/0261907 A1 | 10/2013 | McQuade et al. |
| 2013/0261914 A1 | 10/2013 | Ingram et al. |
| 2013/0268754 A1* | 10/2013 | Baltes ................. H04L 9/3247 713/156 |
| 2013/0275214 A1 | 10/2013 | Kote et al. |
| 2014/0081481 A1 | 3/2014 | Nishida |
| 2014/0100716 A1 | 4/2014 | Kawai et al. |
| 2014/0282470 A1* | 9/2014 | Buga ........................ G06F 8/65 717/170 |
| 2014/0294180 A1 | 10/2014 | Link, II |
| 2014/0379171 A1 | 12/2014 | Kim et al. |
| 2015/0007155 A1* | 1/2015 | Hoffman ................. G06F 8/65 717/168 |
| 2015/0180840 A1* | 6/2015 | Jung ....................... G06F 8/654 713/150 |
| 2015/0298653 A1 | 10/2015 | Schwartz |
| 2015/0317594 A1 | 11/2015 | Reznik et al. |
| 2016/0189447 A1 | 6/2016 | Valenzuela |
| 2016/0203652 A1* | 7/2016 | Throop ................ G07C 5/008 701/36 |
| 2016/0239937 A1 | 8/2016 | Kim et al. |
| 2016/0274160 A1 | 9/2016 | Lee et al. |
| 2016/0330284 A1* | 11/2016 | Holck .................... H04L 67/12 |
| 2016/0347328 A1 | 12/2016 | Takehara et al. |
| 2016/0364225 A1* | 12/2016 | Moeller ................... G06F 8/65 |

* cited by examiner

SELECTING THIRD GAUGE STYLE

| | ≡ Z LYNK | 804 |
|---|---|---|
| Speed<br><br>274.0<br><br>MPH | RPM<br><br>1895<br><br>RPM | RPM, RPM    1002   ✕<br>GAUGE STYLE<br>[☀] [⌒] [▯] [⌂]<br>LEVELS<br>[ Adjust parameters       > ]<br>Units<br>[ RPM ] |
| Throttle Position Sensor<br><br>72<br><br>% | Calculated Load<br><br>72<br><br>% | |

FIG. 10A

SELECTING THIRD GAUGE STYLE

| | ≡ Z LYNK | 606 |
|---|---|---|
| Speed<br><br>3.0<br><br>MPH | RPM<br><br>1925<br><br>RPM | RPM, RPM                    ⚙<br>6000<br>4500  ⎯1008<br>3000                          1925<br>1500<br>0                              RPM<br>1006  1004   (P/N) |
| Throttle Position Sensor<br><br>0<br><br>% | Calculated Load<br><br>0<br><br>% | |

SELECT UNITS

| | ☰ EZ LYNK | |
|---|---|---|
| RPM | Battery Voltage | TRANSMISSION TE... ✕ |
| 3799 | 12.00 | GAUGE STYLE |
| RPM | V | [icons] |
| Transmission Temp. | Throttle Position Sensor | LEVELS |
| 88.9 | 55 | Adjust parameters > |
| 566 ～ °C | % | Units °C ～1302    °F ～1304 |

SLIDE FOR ALTERNATE DISPLAY

| | ☰ EZ LYNK | | 508 |
|---|---|---|---|
| °F | MPH | RPM | V |
| Transmission Temp. | Throttle Position Sensor | Calculated Load | Injector Pressure |
| 127.0 | 96 | 96 | 46.0 |
| °F | % | % | kPSI |

RPM, RPM    87.5   130.0   172.5    Eng. Coolant Temp, °F 4144    45.0   Transmission Temp.   215.0    149.0

SYSTEM AND METHOD FOR REAL TIME WIRELESS ECU MONITORING AND REPROGRAMMING

CROSS REFERENCE TO RELATED APPLICATIONS

This application is claims priority to U.S. Provisional Application No. 62/201,462 filed Aug. 5, 2015, which is incorporated herein by reference in its entirety.

BACKGROUND

An engine control unit or an "ECU" is a widely used type of electronic controller that controls a series of actuators on an internal combustion engine to ensure optimal engine performance. It does this by reading values of a multitude of sensors in the engine bay and interpreting the data it receives using lookup tables which adjust engine actuators appropriately.

The ECU monitors various sensors on the automobile such as sensors for oxygen level, coolant temperature, mass air flow, air intake temperature, crank shaft angle, throttle position, cam shaft angle and engine knock. Lookup tables provide feedback information for adjustment and control of ignition timing, cam shaft position, fuel injector input, fuel pump input, fuel pump pressure, cooling fan speed, transmission control systems, forced air induction controls, traction controls and transmission gear selections. In many situations, ECUs also send error codes to the vehicle dashboard to indicate immediate problems, such as overheating, or maintenance requirements, like oil changes. In some cases, the error codes activate warning lights which must be deactivated by the dealer.

Certain classes of ECUs are programmable. Modern ECUs incorporate a microprocessor which can process inputs from engine sensors in real time. The microprocessor stores its programming in firmware which is resident in flash memory or e-proms attached to the CPU of the microprocessor.

Programmable ECUs are required, for example, where significant aftermarket performance enhancing modifications have been made. Such modifications often include the addition of a turbo charger, intercooler or modified exhaust system. Programmable ECU's are also used for several vehicle systems, such as engine control module (ECM), transmission control module (TCM), body control module, anti-lock brake system (ABS), airbag control module, and so on, that each receive routine updates from the manufacturer of the vehicle. Each ECU is remapped or reprogrammed to adapt the performance of the involved system to match the required modifications and/or to update the software and parameters of the ECU. Other changes for high performance engines which can be remapped in an ECU include ignition timing, maximum RPM, water temperature correction, transient fueling, low fuel pressure modifiers and a closed loop lambda (in order to modify a target air/fuel ratio), turbo charger waste gate control, staged fuel injection, variable cam timing, gear control and turbo charger anti-lag.

BRIEF DESCRIPTION OF THE DRAWINGS

FIGS. 10A and 10B are diagrams of a user interface of a preferred embodiment for selecting a third gauge style.

FIGS. 12A through 12I are diagrams of a user interface of a preferred embodiment for adjusting parameters.

FIGS. 13A and 13B are diagrams of a user interface of a preferred embodiment for selecting units of a gauge.

FIGS. 14A through 14E are diagrams of a user interface of a preferred embodiment for a multiple gauge view with five gauges.

DETAILED DESCRIPTION

Figure 1:
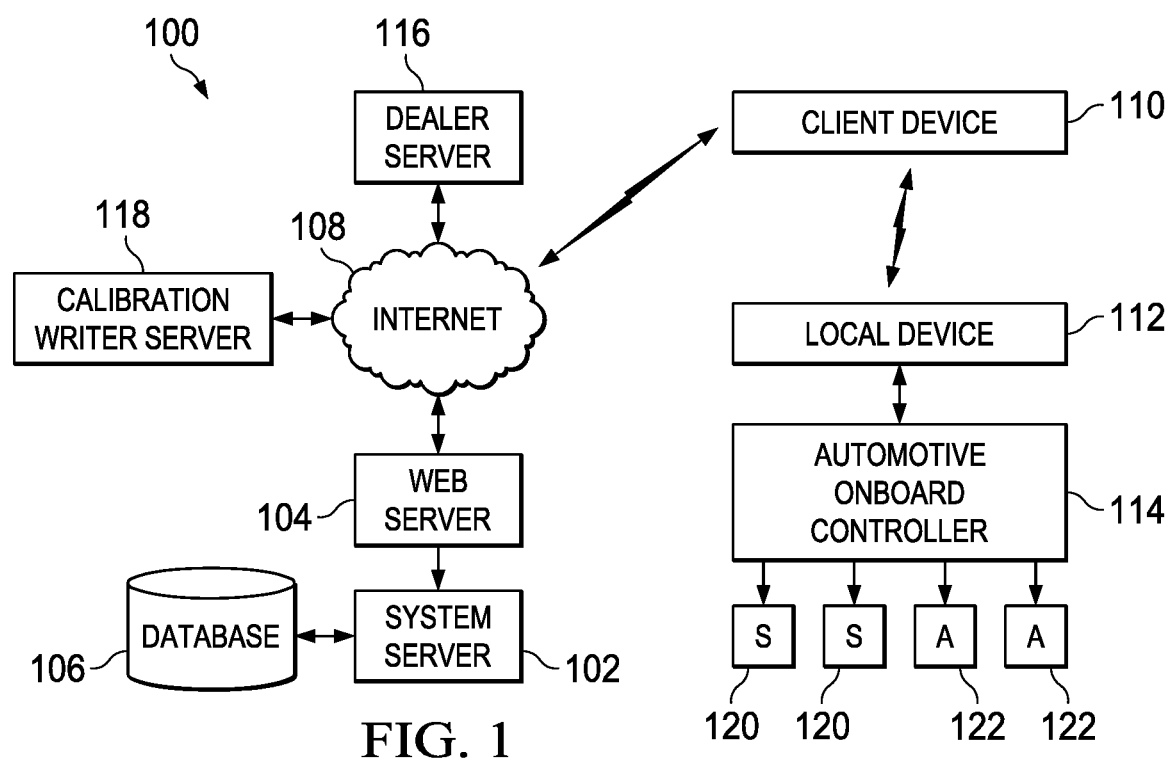
FIG. 1 is a system diagram of a cloud based automotive technician system.

Referring to FIG. 1, system 100 is provided. System 100 includes system server 102 connected to Internet 108 through web server 104. The system server also includes database 106.

Client device 110 is connected through a mobile network to Internet 108. Client device 110 is also connected to local device 112. In a preferred embodiment the local device establishes a Wi-Fi or Bluetooth connection between the client device and the automobile. Local device 112 is hardwired to the automotive controller 114. Automotive controller 114 is connected to sensors 120 and actuators 122 resident on the vehicle. The sensors and actuators communicate with the onboard controller through a CAN BUS (also known as a controller area network (CAN) bus) as is known in the art.

Client device 110, acts as a client of system server 102, and as a client of local device 112. Embodiments of client device 110 include any handheld wireless device, such as, a smart phone, a tablet computer, a notebook computer, a netbook computer, and so on.

Dealer server 116 is also connected to Internet 108 and communicates through the Internet to both the system server and the local device. Similarly, calibration writer server 118 is connected through the Internet to system server 102 and client device 110.

Figure 2A:
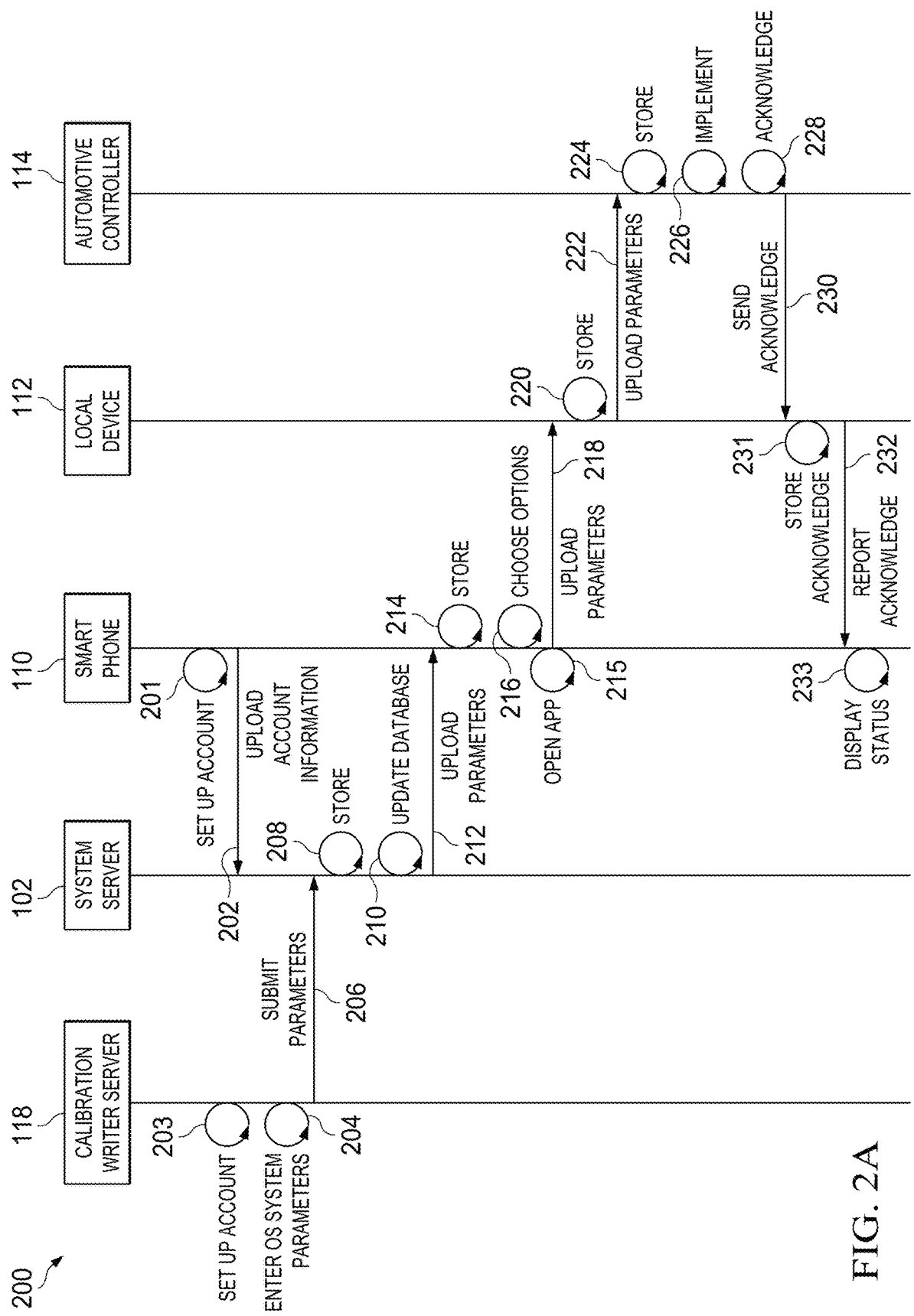
FIG. 2A is a sequence diagram of a method for updating parameters on an automotive controller.

Referring to FIG. 2A, operation of a preferred embodiment 200 will be described. In use, the device allows recording and viewing of automobile information, diagnostics, automobile updates for onboard computers, and data logging to allow study of driving habits to research fuel economy.

At step 201, the client device opens the application and sets up an account by entering certain demographic information. At step 202, the application uploads the account information to system server 102.

At step 203, the calibration writer server sets up an account through a form served up through the Internet from the system server. The calibration writer server includes account information such as name, address, email address, and submit computer Cal/Pid. At step 204, calibration writer server inputs a set of operating system parameters which include programming information and look up tables for the onboard controller. At step 206, the parameters are submitted to system server 102. At step 208, system server 102 stores the parameters and the account implementation. At step 210, the database is updated by the system server with the new parameters and associated with the calibration writer server. At step 212, the system server uploads the parameters to client device 110 via a wireless network.

In an alternative embodiment, a technician downloads the parameters or firmware from calibration writer server 118 via a web browser. The technician then uses system server 102 to download the updated parameters or firmware to smart phone 110.

At step 214, a client device stores the parameters. At step 215, client device opens an application (or "App") which displays the parameters and certain options to the user. At step 216, the client device receives options from the user as to which parameters to implement. At step 218, the chosen parameters are uploaded to the local device via a Wi-Fi or Bluetooth connection. At step 220, the local device stores the parameters and initiates certain timing functions such as onboard recording and storage of data.

At step 222, the chosen parameters are uploaded to the automotive controller. At step 224, the automotive controller stores the new parameters and lookup tables. At step 226 the automotive controller implements the new parameters and lookup tables. At step 228, the automotive controller generates an acknowledge signal. At step 230, the acknowledge signal is sent to the local device. At step 231, the local device stores the acknowledge signal. At step 232, the local device reports the acknowledge signal to client device 110 via the WiFi or Bluetooth connection. At step 233, the client device stores the acknowledge signal and the App displays the status of the local device and the uploaded parameters.

Figure 2B:
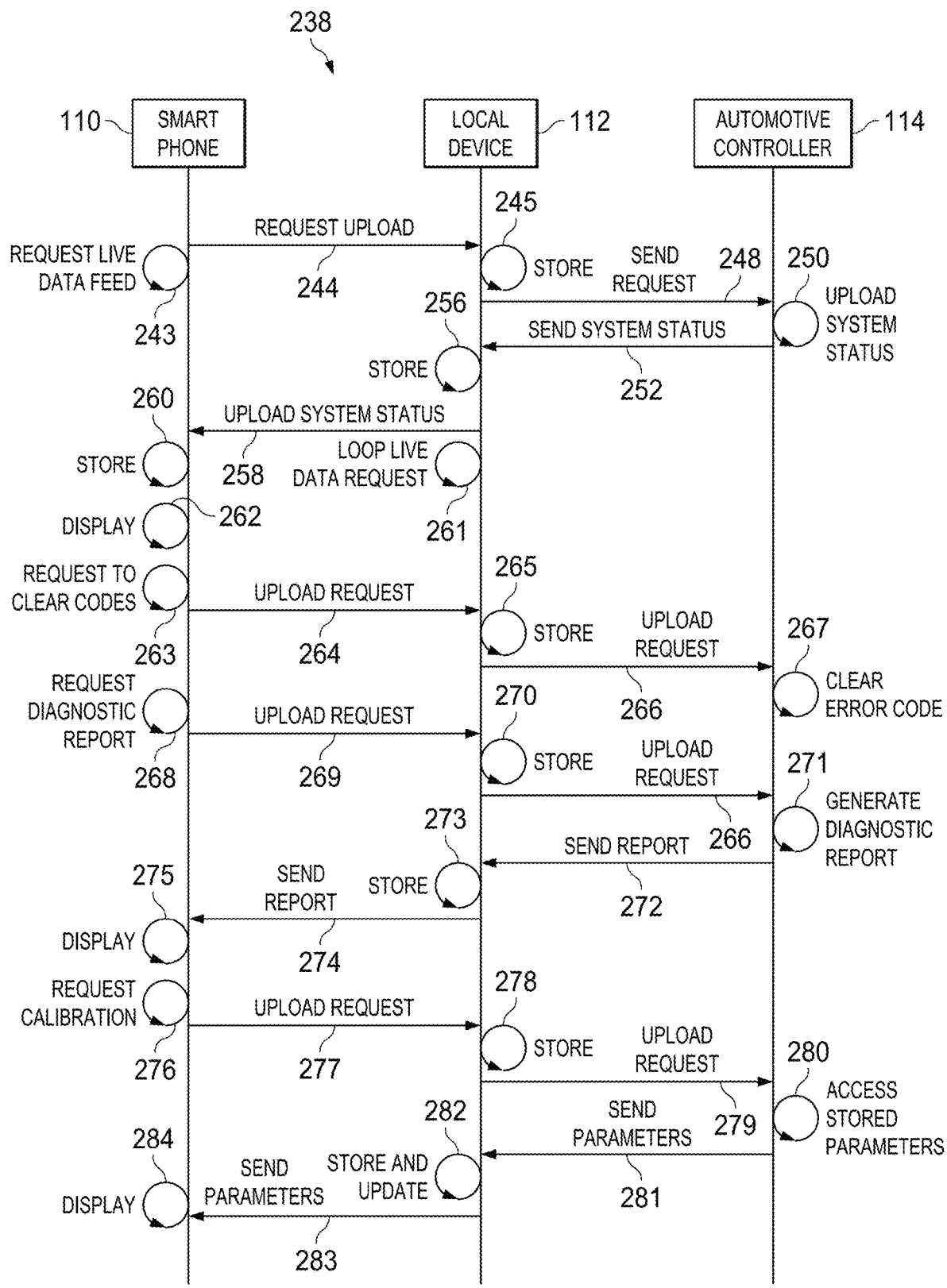
FIG. 2B is a sequence diagram of a method for interaction with an automotive controller and a client device.

Referring to FIG. 2B, an alternate preferred embodiment 238 is described. At step 243, the client device chooses a target for a feed of live data from the automotive controller. Step 244, the client device transmits the request to the local device. At step 245, the local device stores live data request. At step 248, the local device sends a request for live data to automotive controller 114. At step 252, the system status is sent to the local device. At step 256, the local device stores the system status. At step 258, the local device uploads the system status to client device 110. At step 250, the automotive controller uploads the system status from the automobile to the local device. At step 260, client device stores the system status. At step 262, the App displays the system status. The display is refreshed as updated system status is received from the local device. At step 261, the local device enters a loop to repeatedly request system status from the automotive controller.

At step 263, client device 110 chooses an option on the application to clear error codes. At step 264, the request is uploaded to the local device. At step 265, the request is stored in memory on the local device. At step 266, the request is uploaded to the automotive controller. At step 267, the automotive controller acknowledges the request and clears the error code.

At step 268, the client device chooses an option on the application to request a diagnostic report. At step 269, the request is uploaded to the local device. At step 270, the local device stores the request. At step 266, the local device uploads the request to the automotive controller. At step 271, the automotive controller generates the diagnostic report. At step 272, the diagnostic report is sent to the local device. At step 273, the local device stores the diagnostic report, according to date and time, in memory. At step 274, the diagnostic report is sent to the client device. At step 275, the diagnostic report is displayed according to the request of the user.

At step 276, the client device, through use of the application requests a calibration report. At step 277, the calibration request is uploaded to the local device. At step 278, the local device stores the request for calibration. At step 279, the local device forwards the request to the automotive controller. At step 280, the automotive controller accesses the currently stored parameters and the calibration. At step 281, the parameters are sent to the local device. At step 282, the local device stores the current set of parameters according a date and time stamp. At step 283, the local device sends the parameters to the client device. At step 284, the application on the client device displays the requested calibration parameters.

Figure 3:
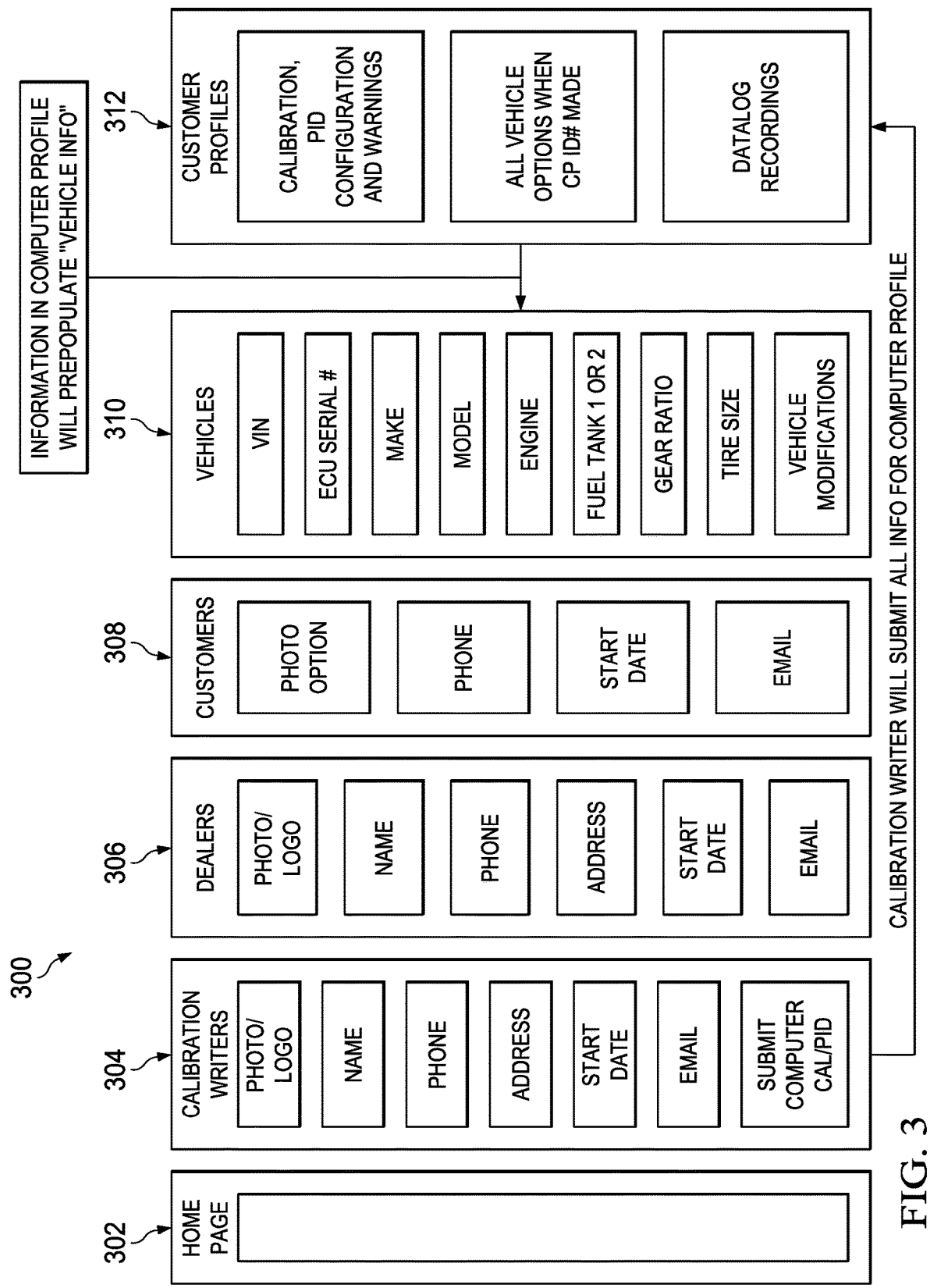
FIG. 3 is a block diagram of a cloud based automotive technician system.

Referring to FIG. 3, a schematic map 300 of the setup of system server 102 and certain functions of a preferred embodiment will be described.

System server 102 presents a set of webpages for the various users of the system through web server 104 using a user/password interface. At 302, 304, and 306 a schematic of the local home page is shown. Local home page provides options for a choice of a user type for each of calibration writer server, a dealer, and a customer or "end user." The database includes records for each vehicle 310 and each computer profile ID number 312. Each record 310 includes vehicle identification number, ECU serial number, make, model, engine, fuel tank number, gear ratio, tire size and vehicle modification categories. Each record is associated with a particular vehicle entered into the system. Computer profile ID number 312 is a database entry including vehicle, calibration, PID configuration, and warning type. Computer profile ID number 312 also includes vehicle options and datalog recordings for each vehicle.

Calibration writers webpage 304 includes forms for entry of a data record for users who input engine control parameters. Each data record includes entries for photos or logos, name, phone, address, start date, email and computer Cal/Pid. When the form is complete, upon entry, system server 102 enters the data from the data form into a record into the database. The system server then copies the data record into computer profiles ID number 312. All reports generated by the automotive controller at the request of the local device are associated with current calibration of the vehicle when stored in memory. In a preferred embodiment, the data in the record is then copied directly into memory at vehicles 310.

The dealers webpage 306 serves up a form for data entry including data related to photo/logo, name, phone, address, start date and email address. The "dealers" in a preferred embodiment are typically maintenance shops which service vehicles but do not write calibrations.

The customers webpage 308 includes a form for entry of data regarding photo, phone number, start date and email address. The web form also enables the customer to request download of an application to be locally installed. The APP GUI provides access to the functions of the local device. In a preferred embodiment, the functions include requesting a report of a current calibration, requesting a live report of engine status, requesting a diagnosis report, requesting that an error code be cleared and uploading a calibration update from a dealer or manufacturer.

A preferred embodiment of local device 112 includes the Freescale IMX28 Microcontroller, a UART for translation between parallel and serial data forms, Wi-Fi connectivity employing the IEEE 802.11 standard or other wireless protocol for communication between client device 110 and the local device 112 and provisions for a local interconnect network LIN for communication between vehicle components and a CAN BUS for communication between microcontrollers and other devices.

Figure 4A:
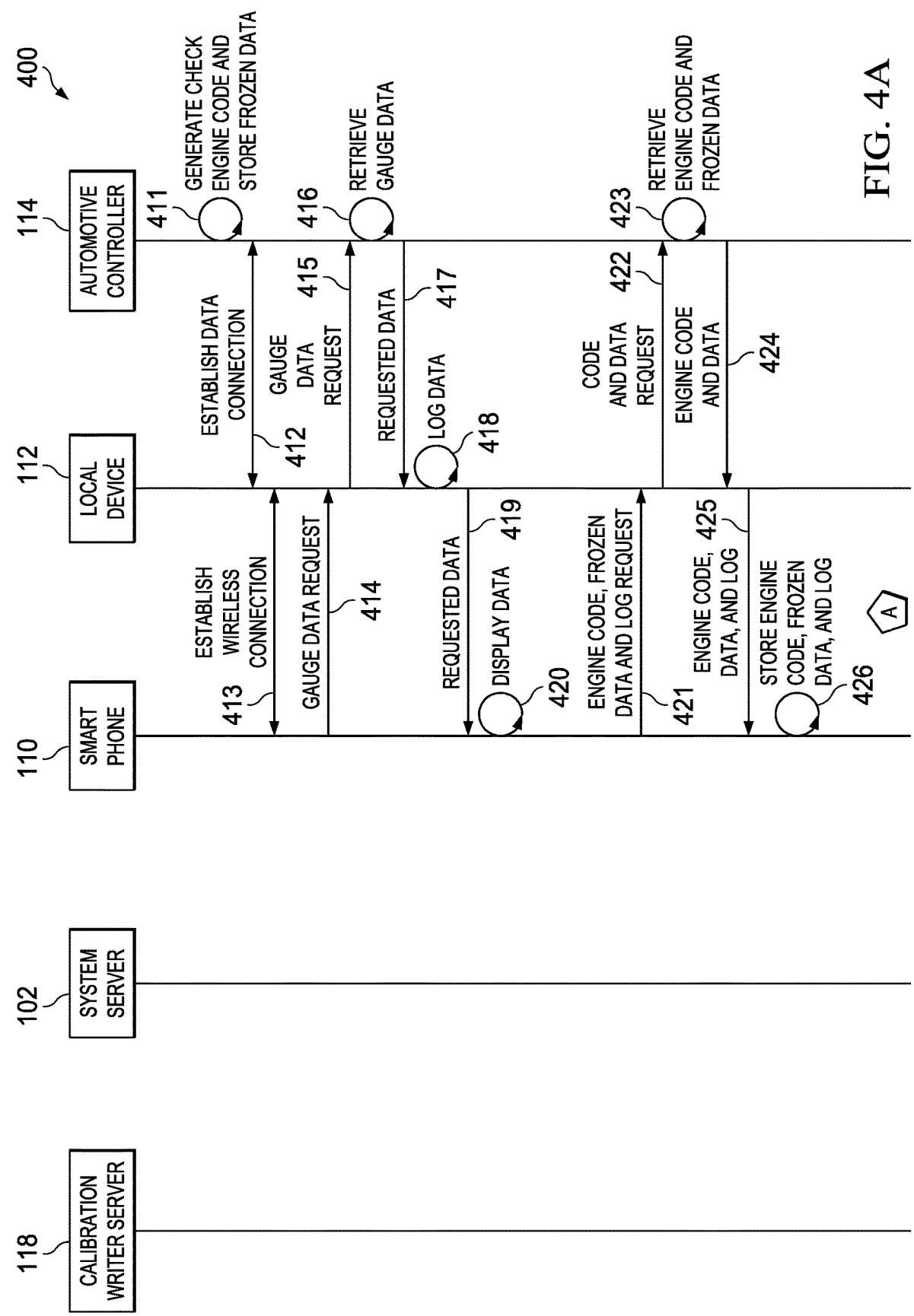
FIGS. 4A and 4B are a sequence diagrams of a method for updating an automotive controller based on data from the automotive controller.
Figure 4B:
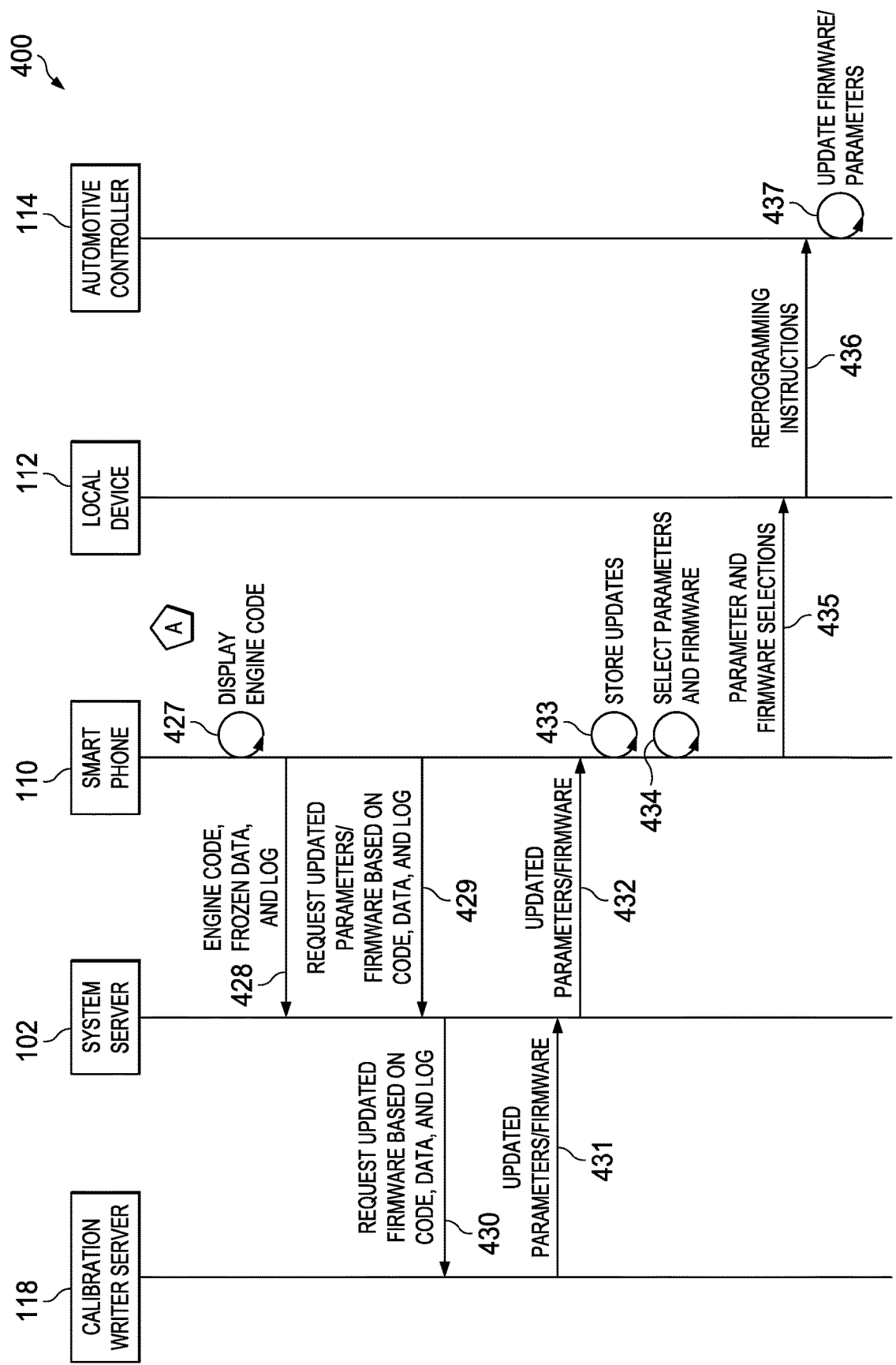

Referring to FIGS. 4A and 4B, method 400 updates engine parameters in response to a check engine code (also referred to as a diagnostic trouble code (DTC)) being generated by automotive controller 114. The method includes one or more messages passed between calibration writer server 118, system server 102, client device 110, local device 112, and automotive controller 114.

At step 411, automotive controller 114 generates a check engine code and freezes a frame of data. The check engine code identifies a problem with the vehicle. The frozen data indicates the status of the vehicle at the time when the problem that caused the check engine code to be generated occurred.

At step 412, a data connection is established between local device 112 and automotive controller 114. In one embodiment, the data connection is established by connecting local device 112 to an onboard diagnostics port that is connected to a CAN BUS to which automotive controller 114 is connected.

At step 413, a wireless connection is established between client device 110 and local device 112. In one embodiment, local device 112 acts as a wireless local area network (WLAN) access point to which client device 110 can connect. In establishing the wireless connection, transmission control protocol (TCP) socket is opened between client device 110 and local device 112 so that data can be passed back and forth between client device 110 and local device 112 using JavaScript Object Notation (JSON) messages.

At step 414, a request for gauge data is sent from client device 110 and is received by local device 112. In one embodiment, the request is sent using JSON using the TCP socket. For each of the one or more gauges displayed by client device 110, a gauge data request is sent. After receiving the request from client device 110 by local device 112, client device 110 is subscribed to and receives notifications from local device 112 that include updated data to be displayed on the gauge associated with the gauge data request.

At step 415, a data request is sent from local device 112 and is received by automotive controller 114.

At step 416, automotive controller 114 retrieves the gauge data. In one embodiment, automotive controller 114 retrieves parameter identifier (PID) data that is associated with the gauge data.

At step 417, the data is sent from automotive controller 114 and is received by local device 112.

Optionally at step 418, local device 112 records the data received from automotive controller 114 in a log file on local device 112.

At step 419, the requested data is sent from local device 112 and is received by client device 110. In one embodiment, client device 110 is subscribed to local device 112 so as to receive a notification from local device 112 each time local device 112 receives updated data from automotive controller 114.

At step 420, the data is displayed by client device 110. The layout settings that describe the look and feel of the gauge are stored on client device 110 and the data is displayed in accordance to the layout settings.

At step 421, a request for the engine code, the frozen data, and optionally the log data is sent from client device 110 and is received by local device 112.

At step 422, a request for the engine code and the frozen data is sent from local device 112 and is received by automotive controller 114.

At step 423, automotive controller 114 retrieves the engine code and frozen data that were generated in step 411.

At step 424, the engine code and frozen data are sent from automotive controller 114 and are received by local device 112.

At step 425, the engine code, frozen data, and optional log are sent from local device 112 and are received by client device 110.

At step 426, client device 110 stores the engine code, frozen data, and optional log.

At step 427, client device 110 displays the engine code.

At step 428, the engine code, frozen data, and optional log is sent from client device 110 and is received by system server 102.

At step 429, a request for updated engine parameters is sent from client device 110 and is received by system server 102.

At step 430, a request for updated engine parameters is sent from system server 102 and is received by calibration writer server 118.

At step 431, updated parameters and/or firmware are sent from calibration writer server 118, and are received by system server 102.

At step 432, the updated parameters and firmware are sent from system server 102 and are received by client device 110.

At step 433, the updated parameters and firmware are stored on client device 110.

At step 434, the technician selects one or more parameters and firmware with which to update the vehicle.

At step 435, the selected parameters and firmware are sent from client device 110 and are received by local device 112. One or more parameters and the firmware may be selected to be updated and are sent.

At step 436, reprogramming instructions are sent from local device 112 and are received by automotive controller 114. In one embodiment, the instructions cause automotive controller 114 to be flashed with the updated firmware when the firmware is selected to be updated. Additionally, parameters can be changed beyond what was included with the updated firmware. The updated firmware may be the latest default firmware from the vehicle manufacturer that does not have every parameter tuned for the specific configuration of the vehicle. In one embodiment, the reprogramming instructions of local device 112 first reflashes automotive controller 114 with the updated firmware and then updates specific engine tuning parameters.

At step 437, automotive controller 114 updates the firmware and parameters to the values received from local device 112.

Figures 5A, 5B:
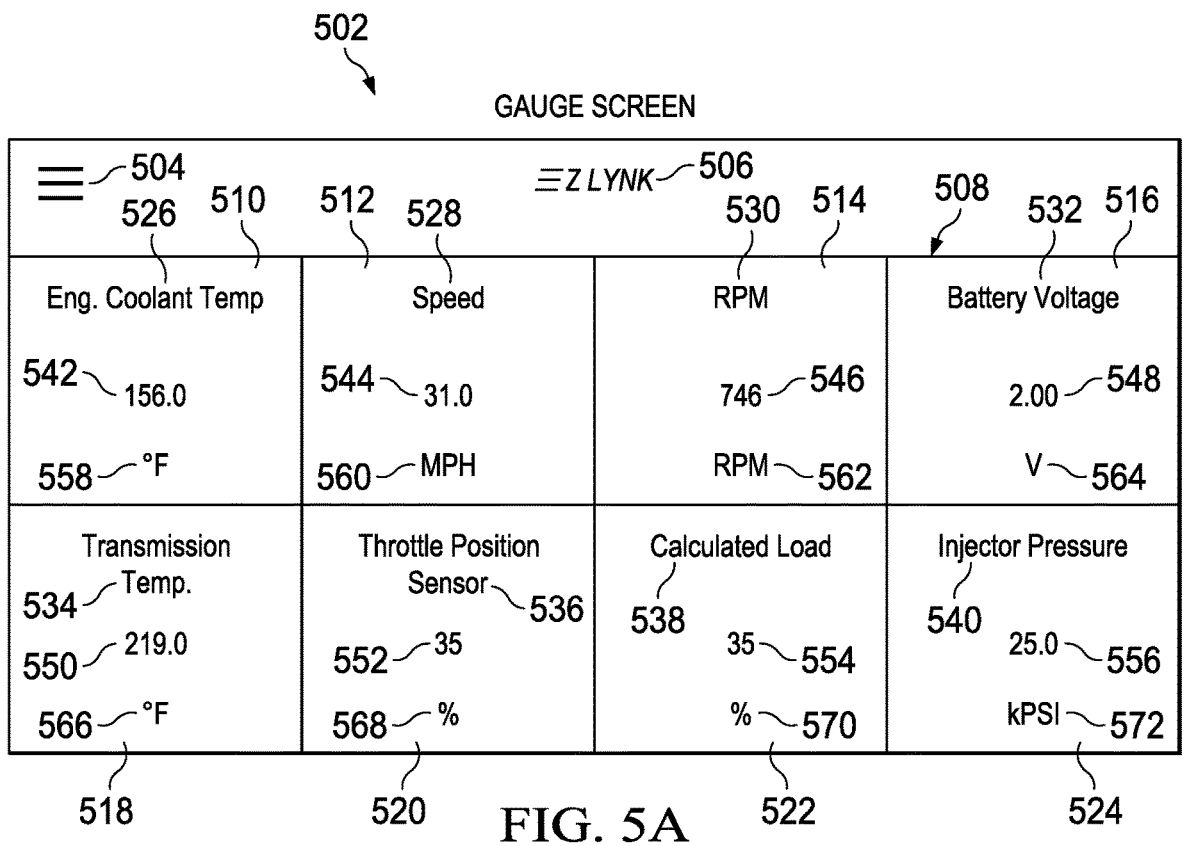
FIG. 5A is a diagram of a user interface of a preferred embodiment for a multiple gauge view with eight gauges.
FIG. 5B is a diagram of a user interface of a preferred embodiment for dragging and dropping a gauge.

Referring to FIGS. 5A and 5B, user interface 502 includes menu button 504 on title bar 506, which is above multiple gauge view 508. Multiple gauge view 508 includes eight (8) mini gauge views 510, 512, 514, 516, 518, 520, 522, and 524.

User interface 502 is displayed on a client device via an app running on the client device. The name, value, and units of each respective mini gauge 510, 512, 514, 516, 518, 520, 522, and 524 are displayed on user interface 502 on a client device. Values 542, 544, 546, 548, 550, 552, 554, and 556 respectively of each mini gauge 510, 512, 514, 516, 518, 520, 522, and 524 are continuously updated as new PID values are received from the automotive controller. In the embodiment of FIG. 5A, ten (10) PIDs are named with the units indicated in the table below. PID values, names, and units may be different for different vehicles and the table below is merely one example

| PID | Mini Gauge View | Name | Units |
| --- | --- | --- | --- |
| 0 | 510 | Engine Coolant Temperature | Degrees Fahrenheit (° F.) |
| 1 | 512 | Speed | Miles per Hour (MPH) |
| 2 | 530 | Revolutions per Minute | Revolutions per Minute (RPM) |
| 3 | 532 | Battery Voltage | Voltage (V) |
| 4 | 518 | Transmission Temperature | Degrees Fahrenheit (° F.) |
| 5 | (not shown) | Boost | Pounds per Square Inch (PSI) |
| 6 | 522 | Calculated Load | Percent of Max (%) |
| 7 | 524 | Injector Pressure | Thousand Pounds per Square Inch (kPSI) |
| 8 | (not shown) | Injector Pulse Width | Milliseconds (ms) |
| 9 | 520 | Throttle Position Sensor | Percent of Max (%) |

Mini gauge view 510 includes name 526, value 542, and units 558 and is associated with a PID. Name 526 indicates that mini gauge 510 displays the engine coolant temperature, which value 542 indicates is at 156.0, which units 558 indicates are in degrees Fahrenheit. Mini gauge view 510 is shaded in a green color to indicate that value 542 is within a desired range for the engine coolant temperature.

Mini gauge view 512 includes name 528, value 544, and units 560 and is associated with a PID. Name 528 indicates that mini gauge 512 displays the speed, which value 544 indicates is at 31.0, which units 560 indicates are in miles per hour. Mini gauge view 512 is not shaded green, which would indicate that value 544 is in a desired range, and is not shaded red, which would indicate that value 544 is in a warning range.

Mini gauge view 514 includes name 530, value 546, and units 562 and is associated with a PID. Name 530 indicates that mini gauge 514 displays the revolutions per minute (RPM) of the engine, which value 546 indicates is at 31.0, which units 562 indicates are in revolutions per minute. Mini gauge view 514 is not shaded green, which would indicate that value 546 is in a desired range, and is not shaded red, which would indicate that value 546 is in a warning range.

Mini gauge view 516 includes name 532, value 548, and units 564 and is associated with a PID. Name 532 indicates that mini gauge 516 displays the battery voltage of the engine, which value 548 indicates is at 2.00, which units 564 indicates are in Volts (V). Mini gauge view 516 is shaded red to indicate that value 548 is within a warning range for the battery voltage.

Mini gauge view 518 includes name 534, value 550, and units 566 and is associated with a PID. Name 534 indicates that mini gauge 518 displays the transmission temperature of the engine, which value 550 indicates is at 219.0, which units 566 indicates are in degrees Fahrenheit. Mini gauge view 518 is shaded red to indicate that value 550 is within a warning range for the transmission temperature.

Mini gauge view 520 includes name 536, value 552, and units 568 and is associated with a PID. Name 536 indicates that mini gauge 520 displays the throttle position sensor, which value 552 indicates is at 35, which units 568 indicates is a percentage value. Mini gauge view 520 is not shaded green, which would indicate that value 552 is in a desired range, and is not shaded red, which would indicate that value 552 is in a warning range.

Mini gauge view 522 includes name 538, value 554, and units 570 and is associated with a PID. Name 538 indicates that mini gauge 522 displays the calculated load on the engine, which value 554 indicates is at 35, which units 570 indicates is a percentage value. Mini gauge view 522 is not shaded green, which would indicate that value 554 is in a desired range, and is not shaded red, which would indicate that value 554 is in a warning range.

Mini gauge view 524 includes name 540, value 556, and units 572 and is associated with a PID. Name 540 indicates that mini gauge 524 displays the injector pressure of the engine, which value 556 indicates is at 25.0, which units 572 indicates is in thousand pounds per square inch (kPSI). Mini gauge view 524 is shaded green to indicate that value 556 is in a desired range.

FIG. 5B shows a drag and drop operation used to swap the location of two mini gauges on multiple gauge view 508. The location of mini gauge 514 is swapped with the location of mini gauge 524 within multiple gauge view 508 by dragging mini gauge 514 from its original location towards the original location of mini gauge 524.

Figure 6A:
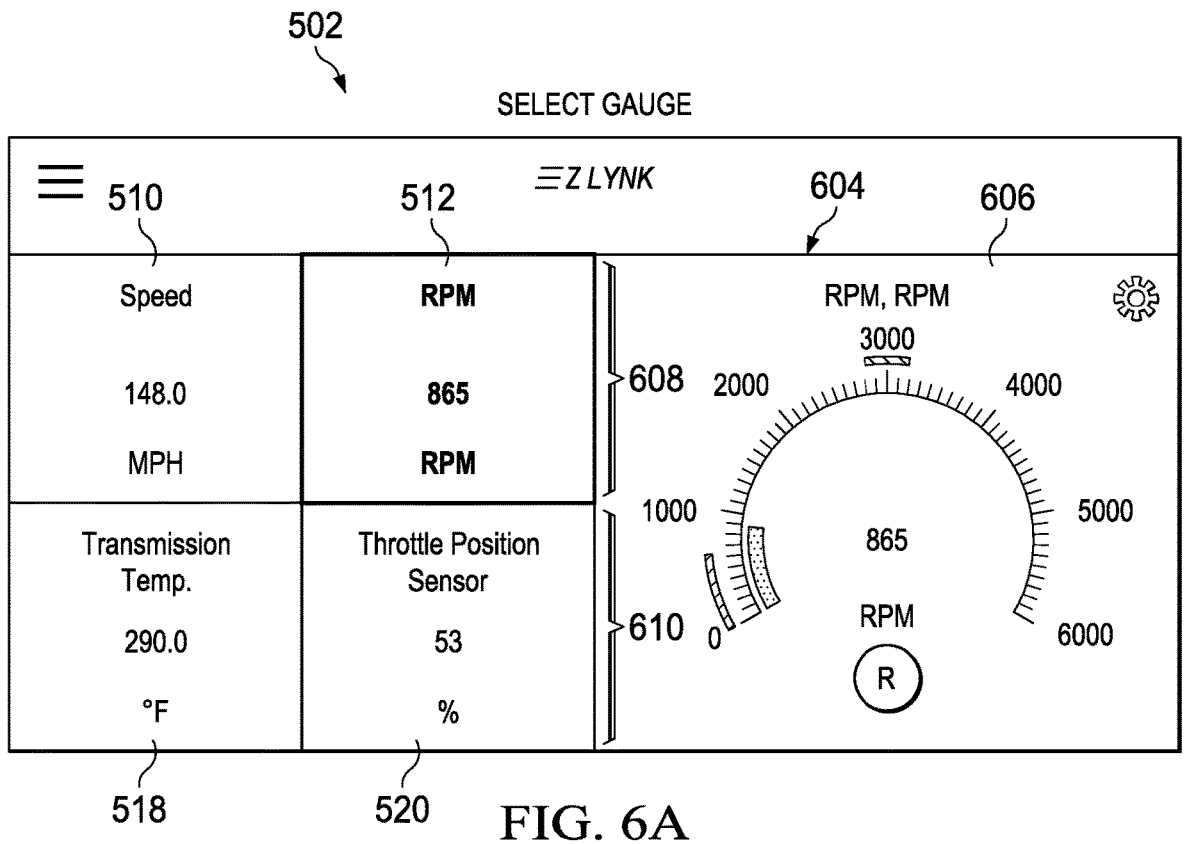
FIGS. 6A, 6B, and 6C are diagrams of a user interface of a preferred embodiment for a multiple gauge view with four sliding gauges.

Referring to FIG. 6A, user interface 502 is updated to display multiple gauge view 604. Multiple gauge view 604 includes four (4) mini gauge views (512, 530, 518, and 520) and one selected gauge view 606. Mini gauge 530 is updated to have its display be highlighted to indicate that gauge 530 is associated with, and has the same PID as, selected gauge 606. User interface 502 transitions from multiple gauge view 508 (eight gauge view 508) to multiple gauge view 604 (four gauge view 604) when gauge 530 is selected from multiple gauge view 508 via a touch or click event.

Upper row 608 includes mini gauges 510 and 512. Lower row 610 includes mini gauges 518 and 520.

Figure 6B:
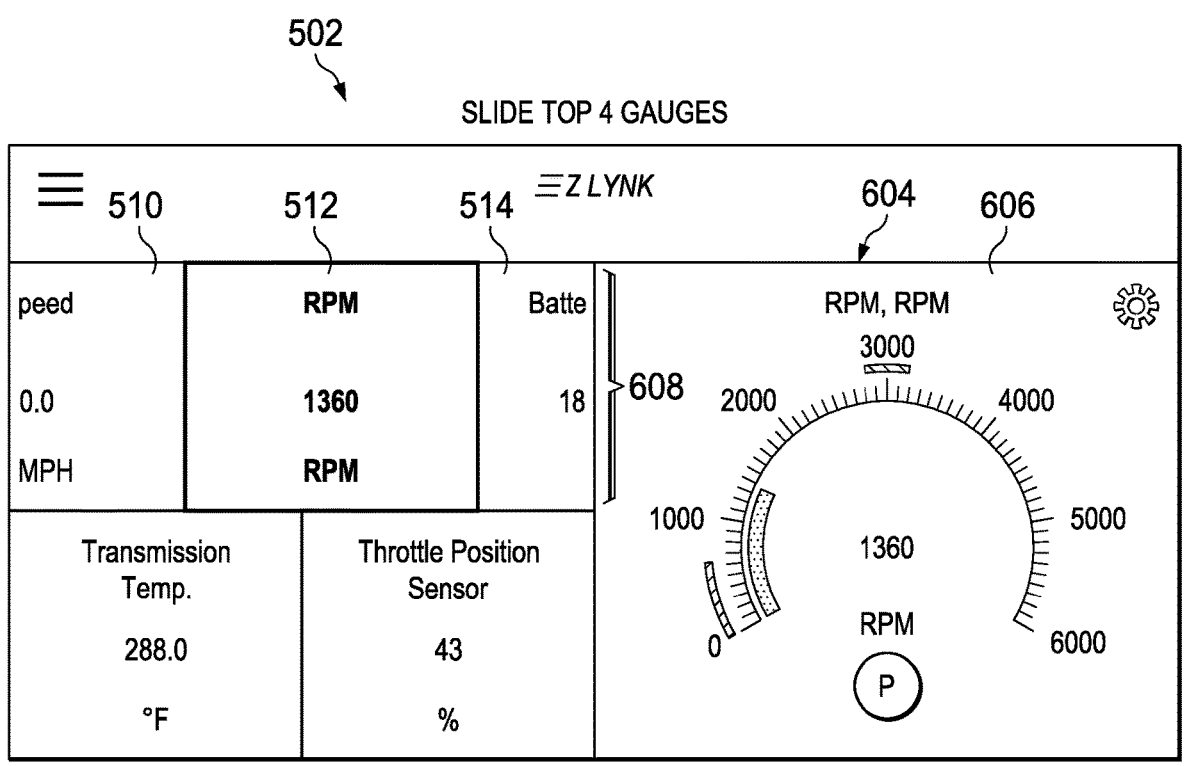

Referring to FIG. 6B, upper row 608 is slid or dragged to the left to reveal mini gauge 516. Any two adjacent mini gauge views 510, 512, 514, and 516 can be displayed in upper row 608 by sliding or dragging upper row 608 left or right. During a drag or slide event, up to three mini gauge views may be displayed. After the drag or slide event, two mini gauge views are displayed, which need not include the mini gauge that has been selected (which in FIG. 6B is mini gauge 512).

Figure 6C:
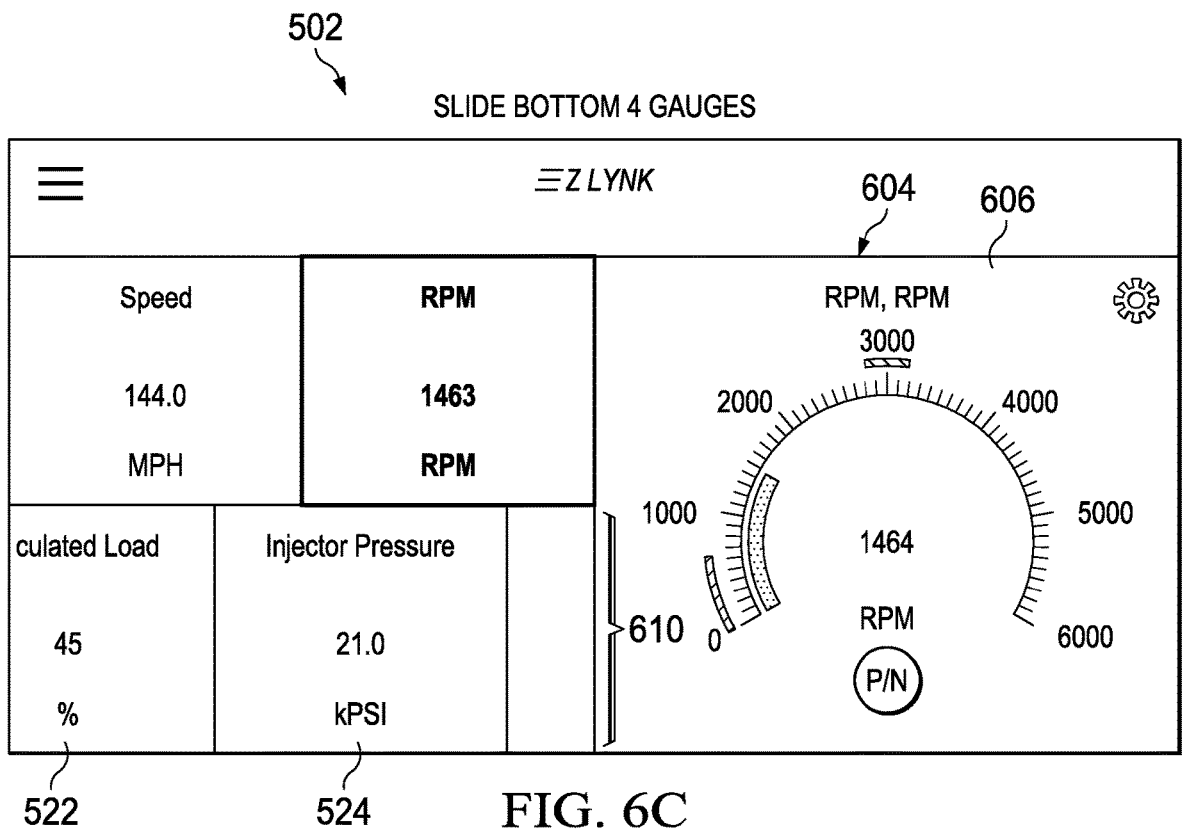

Referring to FIG. 6C, lower row 610 is slid or dragged to the left. Any two adjacent mini gauge views 518, 520, 522, and 524 can be displayed in lower row 610 by sliding or dragging lower row 610 left or right. During a drag or slide event, up to three mini gauge views may be displayed. After the drag or slide event, two mini gauge views are displayed, which need not include the mini gauge that has been selected.

Figure 7A:
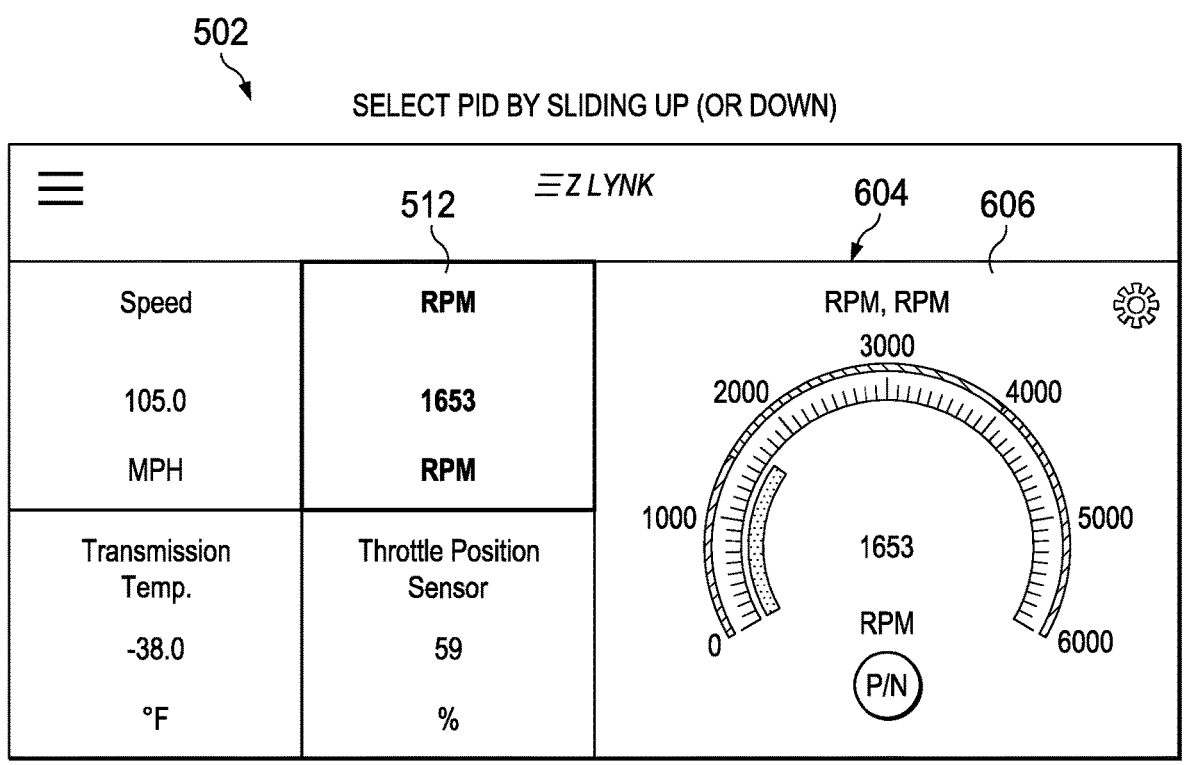
FIGS. 7A, 7B, and 7C are diagrams of a user interface of a preferred embodiment for selecting a gauge.
Figure 7B:
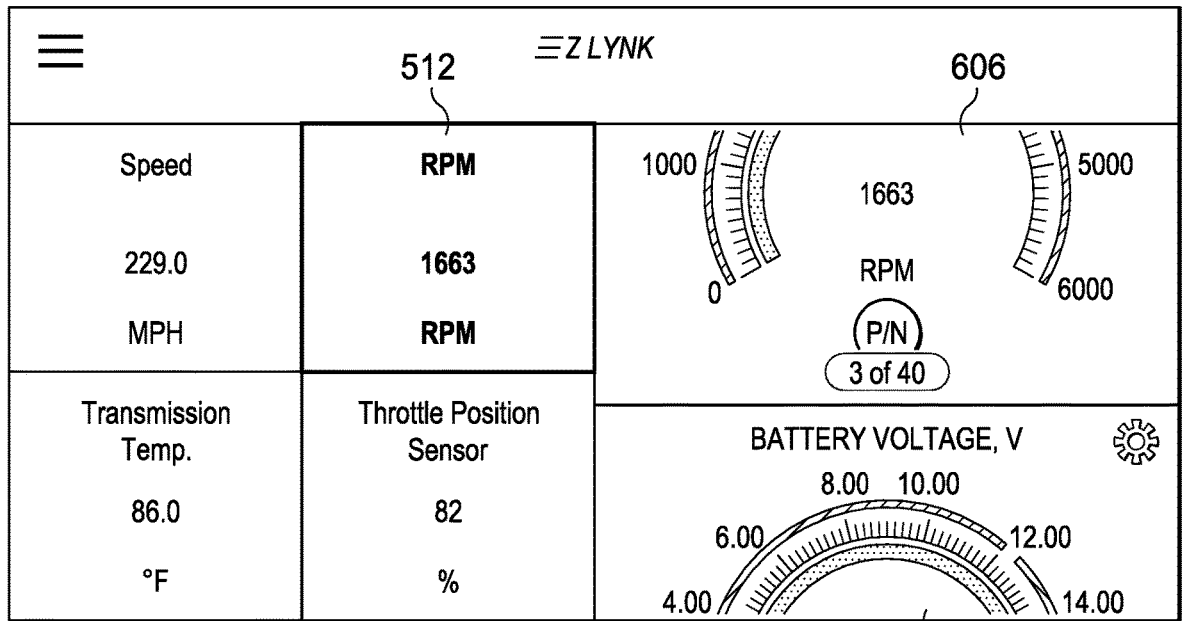
Figure 7C:
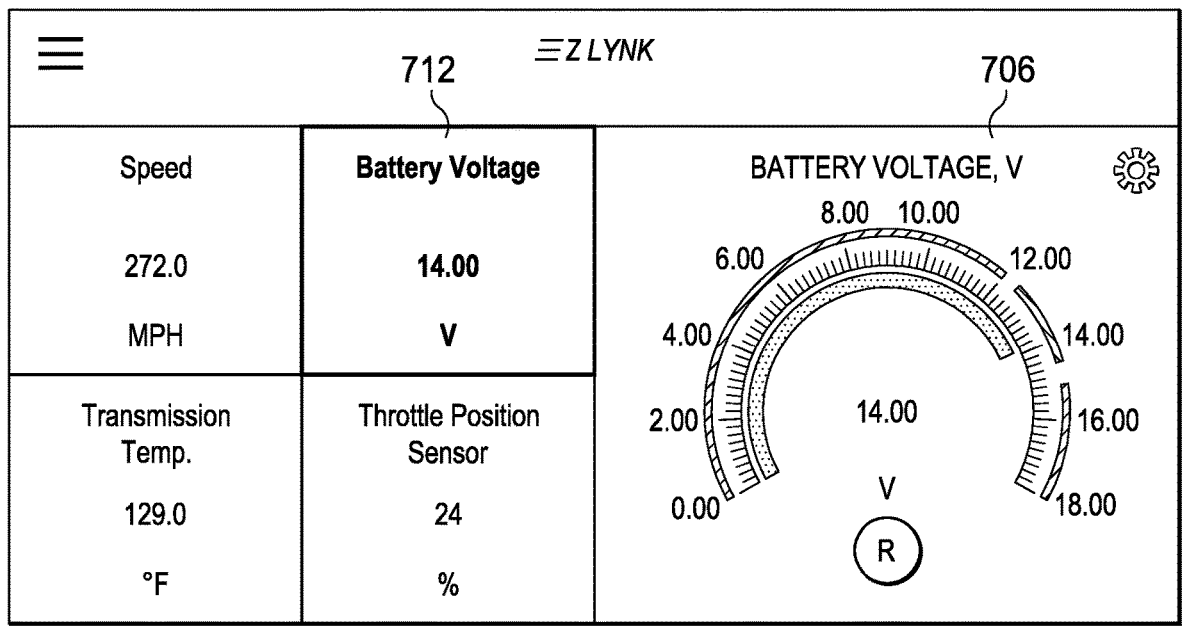

Referring to FIGS. 7A, 7B, and 7C, user interface 502 is manipulated to change the PID of mini gauge view 530.

At FIG. 7A, multiple gauge view 604 is displayed on user interface 502.

Mini gauge view 530 has been selected and selected gauge view 606 is shown on user interface 502.

At FIG. 7B, selected gauge view is slid or dragged up to reveal second selected gauge view 706.

At FIG. 7C, mini gauge view 512 is updated to become mini gauge view 712. In on embodiment, mini gauge view 712 duplicates the information from mini gauge view 532 so that when mini gauge view 712 is unselected and user interface 502 transitions back to multiple gauge view 508, both mini gauge view 532 and mini gauge view 712 are displayed and both show the battery voltage.

Figure 8A:
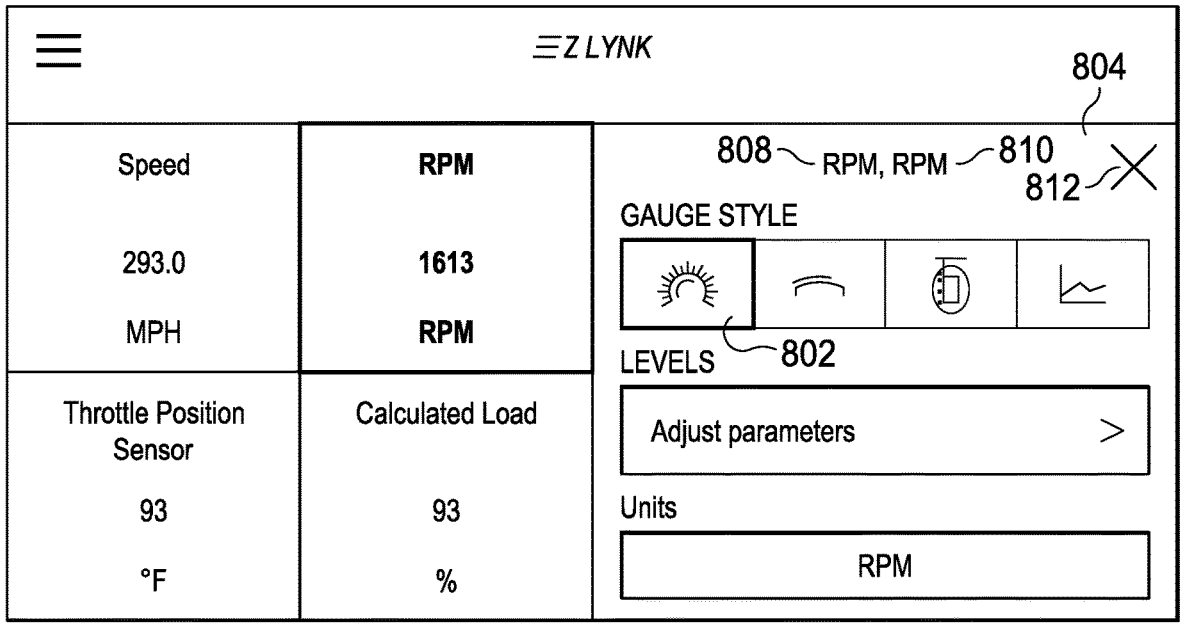
FIGS. 8A and 8B are diagrams of a user interface of a preferred embodiment for selecting a first gauge style.
Figure 8B:
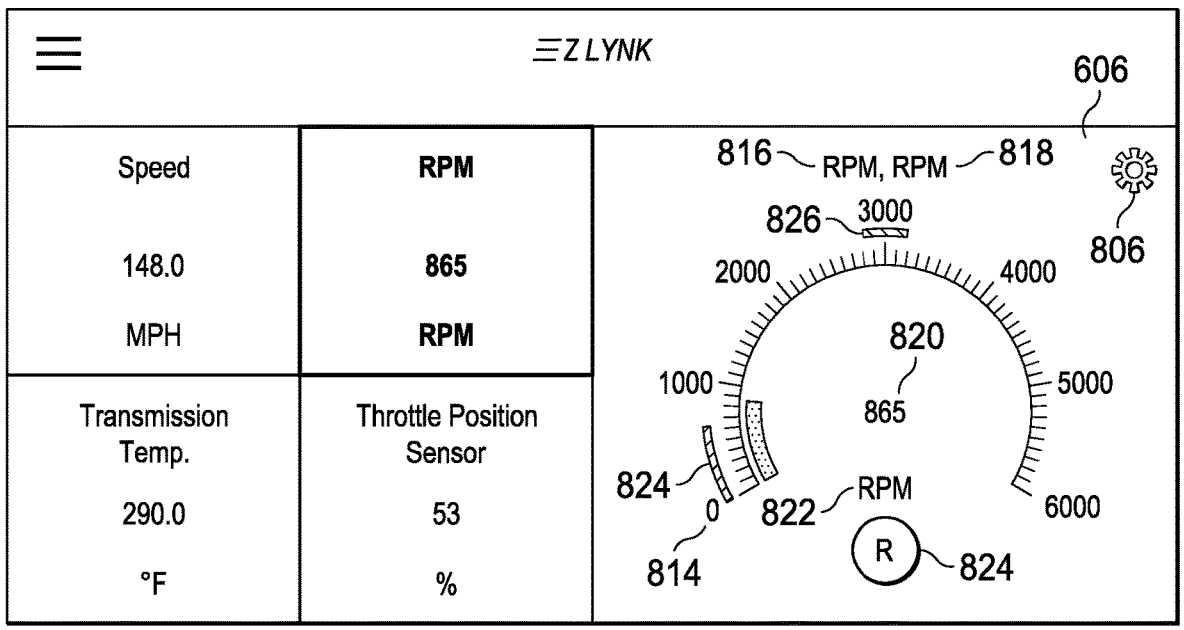

Referring to FIGS. 8A and 8B, circular gauge style 802 from settings view 804 is selected for selected gauge view 606. Settings view 802 of FIG. 8A is displayed after user interface element 806 is selected from selected gauge view 606 of FIG. 8B.

Settings view 804 includes name 808 and units 810 that identify the name and units of the PID that is associated with selected view 606. Settings view 804 includes user interface element 812 that, when selected, transitions user interface 502 from displaying settings view 804 (FIG. 8A) to displaying settings view 606 (FIG. 8B). With the selection of circular gauge style 802, circular gauge view 814 will be shown on selected gauge 606.

On selected gauge view 606, name 816 and units 818 that identify the name and units of the PID that is associated with selected view 606. Value 820 indicates the current value of the PID associated with selected gauge view 606. Units 822 indicates the current value of the PID associated with selected gauge view 606. User interface element 824 indicates what gear is being reported by the automotive controller as the current gear of the vehicle.

Circular gauge view 814 includes warning section 824. In one embodiment, warning section 824 is shaded in red and indicates that the RPM level is too low.

Circular gauge view 814 includes desired section 826. In one embodiment, desired section 826 is shaded in green and indicates that the RPM level is in a desired operating range for the vehicle.

Figures 9A, 9B:
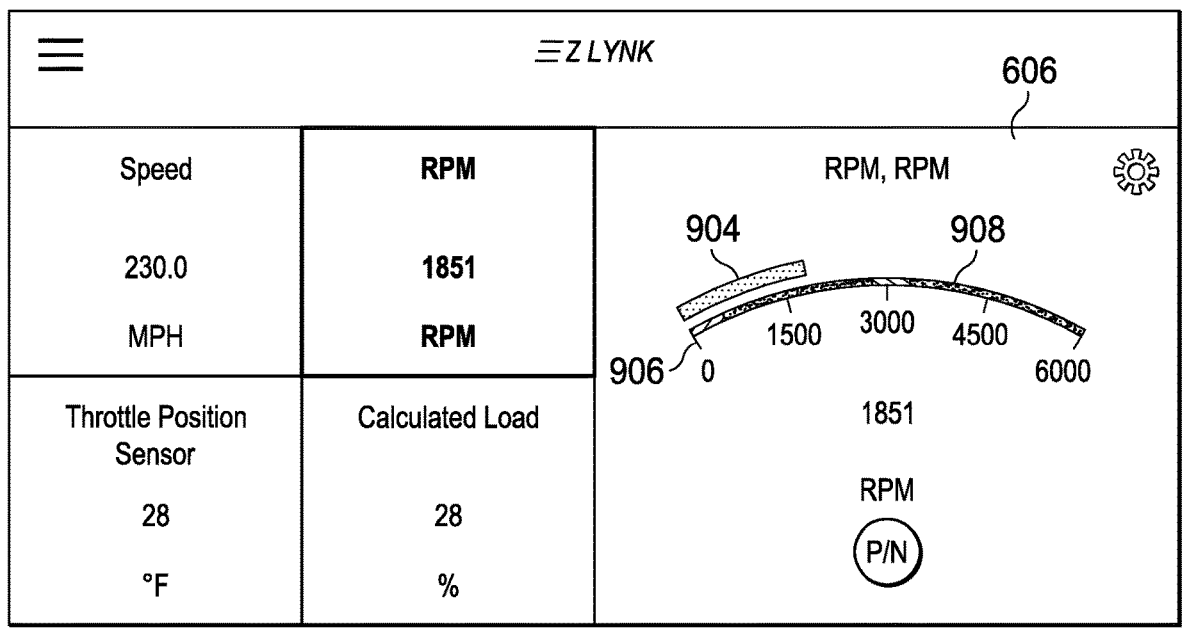
FIGS. 9A and 9B are diagrams of a user interface of a preferred embodiment for selecting a second gauge style.

Referring to FIGS. 9A and 9B, arc gauge style 902 from settings view 804 is selected for gauge view 606. When arc gauge style 902 is selected, selected gauge view 606 shows arc gauge view 904. Arc gauge view 904 includes warning section 906. In one embodiment, warning section 906 is shaded in red and indicates that PID values that are within warning section 906 are too low.

Arc gauge view 904 includes desired section 908. In one embodiment, desired section 908 is shaded in green and indicates that PID values that are within desired section 908 are in a preferred range for one of maximum torque or horsepower.

Referring to FIGS. 10A and 10B, bar gauge style 1002 from settings view 804 is selected for gauge view 606. When bar gauge style 1002 is selected, selected gauge view 606 shows bar gauge view 1004. Bar gauge view 1004 includes warning section 1006. In one embodiment, warning section 1006 is shaded in red and indicates that PID values that are within warning section 1006 are too low.

Bar gauge view 1004 includes desired section 1008. In one embodiment, desired section 1008 is shaded in green and indicates that PID values that are within desired section 1008 are in a preferred range for one of maximum torque or horsepower.

Figures 11A, 11B:
FIGS. 11A and 11B are diagrams of a user interface of a preferred embodiment for selecting a fourth gauge style.

Referring to FIGS. 11A and 11B, line history gauge style 1102 from settings view 804 is selected for gauge view 606. When line history gauge style 1102 is selected, selected gauge view 606 shows line history gauge view 1104. Line history gauge view 1104 is a graph that shows recent values for the selected gauge as a function of time. The recent values are stored on the client device. Line history gauge view 1104 shows the most recent data on the right-hand-side of the chart.

Referring to FIGS. 12A through 12I, user interface 502 comprises multiple gauge view 604 with selected gauge view 606. Selected gauge view 606 includes warning section 824, desired section 826, and warning section 1202 that are each adjustable. Warning section 824 identifies when the PID value is too low and warning section 1202 identifies when the PID value is too high.

To adjust the settings for warning section 824, desired section 826, and warning section 1202, user interface element 806 is selected to display settings view 804 (FIG. 12B) and then user interface element 1204 is selected from settings view 804 to display view 1206 (FIG. 12C) on user interface 502. View 1206 is also referred to as parameter adjustment view 1206.

Parameter adjustment view 1206 includes user interface element 1208, user interface element 1210, name 1212, and units 1214

User interface element 1208 is a cancel button that, when selected, undoes changes that were made in parameter adjustment view 1206. After selecting user interface element 1208, user interface 502 returns to multiple gauge view 604 with settings view 804, as in FIG. 12B.

User interface element 1210 is a button that, when selected, accepts changes that were made in parameter adjustment view 1206. After selecting user interface element 1210, user interface 502 returns to multiple gauge view 604 with settings view 804, as in FIG. 12B.

Name 1212 and units 1214 identify the type and units of the PID information that is displayed on view 1206. In one embodiment, name 1212 is revolutions per minute (RPM) and units 1214 are RPM.

User interface element 1216 is a checkbox that indicates whether desired section 826 is shown on selected gauge view 606. The range of desired section 826 is controlled by the range between minimum desired threshold 1218 and maximum desired threshold 1220. When the PID value is between minimum desired threshold 1218 and maximum desired threshold 1220, then the PID value is in a desired or preferred range.

The display of warning section 824 and warning section 1202 are controlled by user interface element 1222. The range of the gap between warning section 824 and warning section 1202 is controlled by the range between minimum warning threshold 1224 and maximum warning threshold 1226. When the PID value is below minimum desired threshold 1224 or above maximum desired threshold 1226, then the PID value is in a warning range that could lead to engine fault, damage, or failure.

User interface element 1228 identifies whether the defuel settings are active. When the PID value is below minimum defuel threshold 1224 or above maximum defuel threshold

1226, then the PID value is in a defuel range where the fuel supply to the engine will reduced in order to protect the engine.

In one embodiment, the relationships shown below are maintained by the thresholds displayed on parameter adjustment view 1206.

minimum defuel threshold 1230≤minimum warning
threshold 1224   Rel.1 minimum warning threshold 1224≤minimum desired
threshold 1218   Rel.2 minimum desired threshold 1218≤maximum desired
threshold 1220   Rel.3 maximum desired threshold 1220≤maximum warning threshold 1226   Rel.4 maximum warning threshold 1226≤maximum defuel
threshold 1232   Rel.5

Figure 12A:
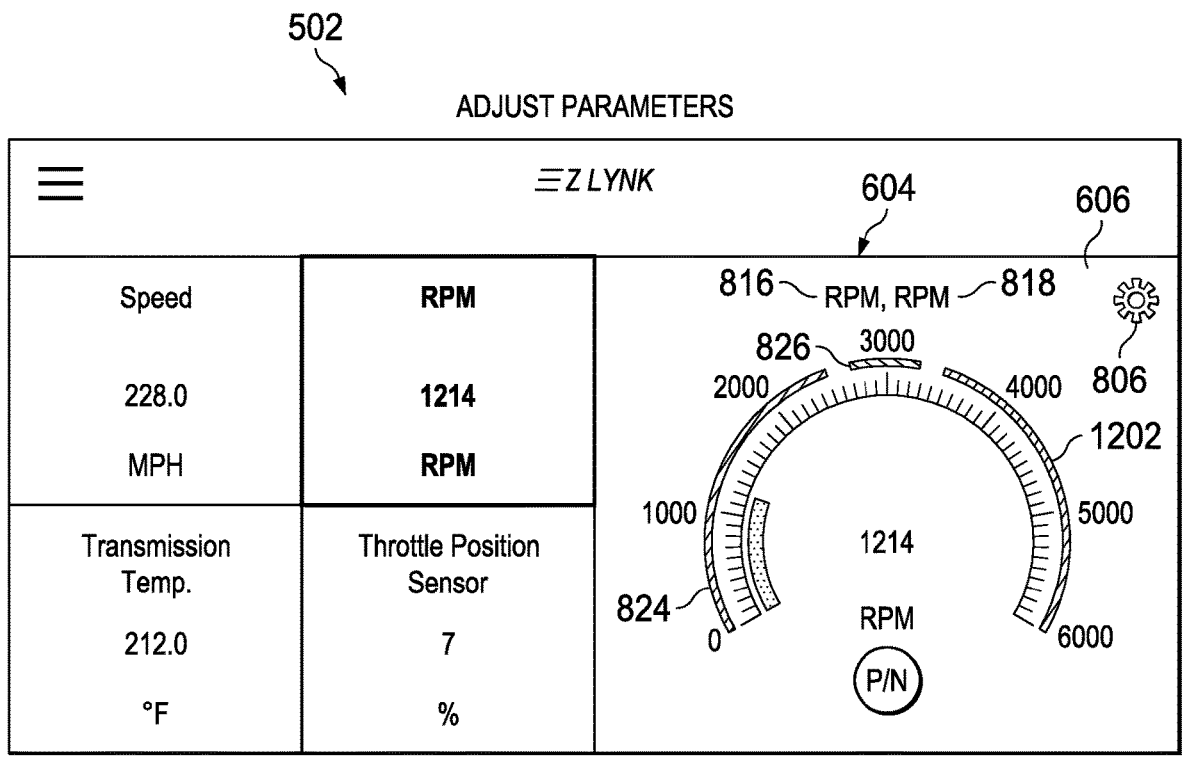
Figure 12B:
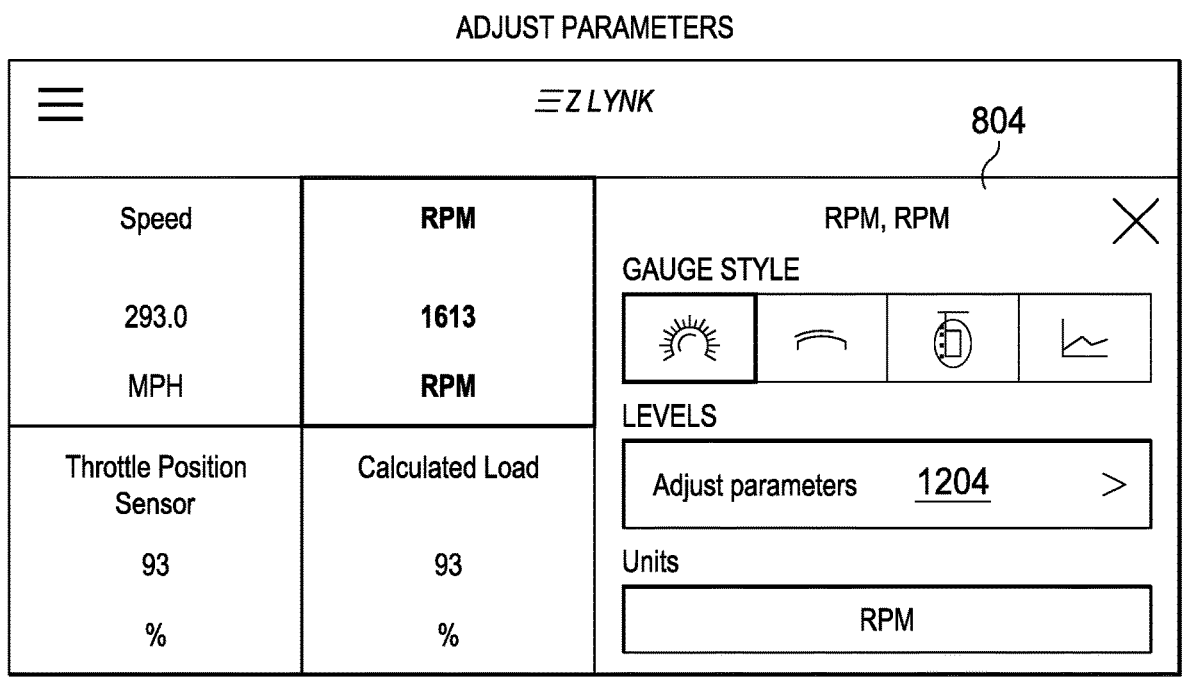
Figure 12C:
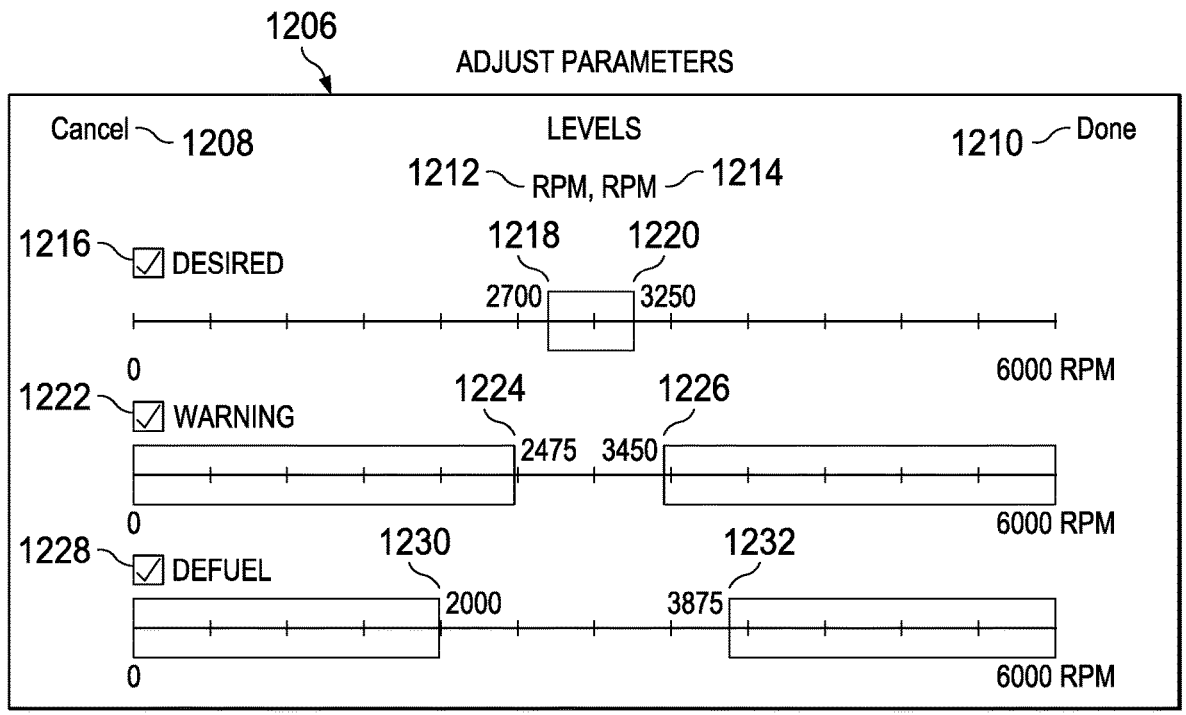
Figure 12D:
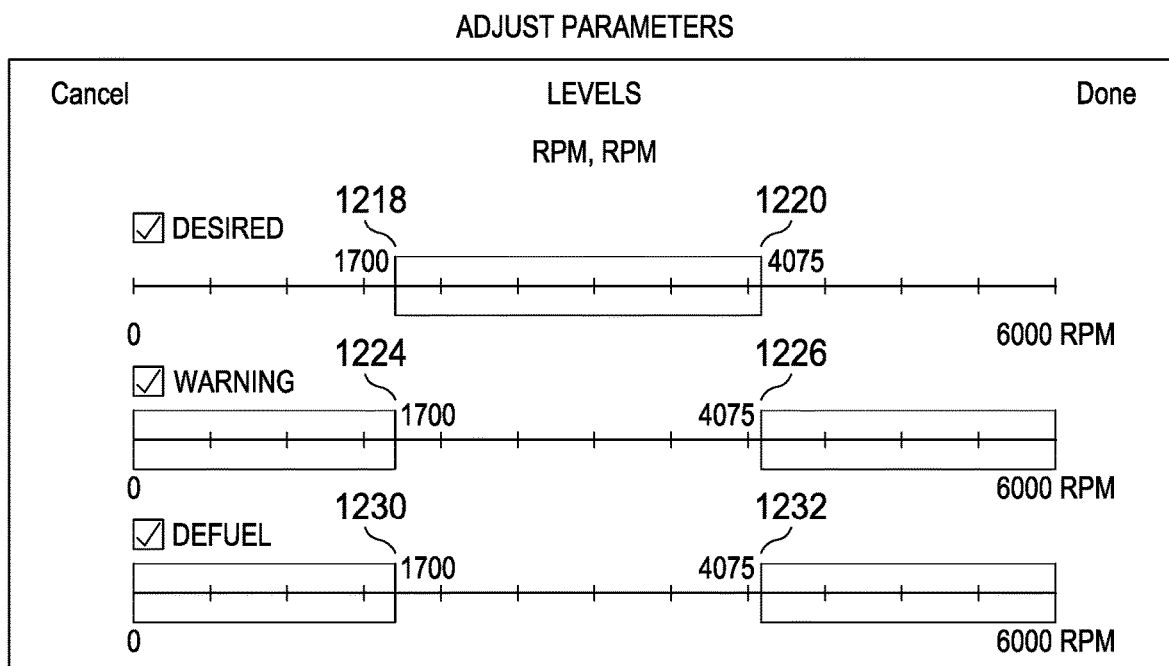

Referring to FIG. 12D, when minimum desired threshold 1218 is dragged to the left, minimum warning threshold 1224 and minimum defuel threshold 1230 may also move to the left so that both minimum warning threshold 1224 and minimum defuel threshold 1230 remain less than or equal to minimum desired threshold 1218.

When maximum desired threshold 1220 is dragged to the right, maximum warning threshold 1226 and maximum defuel threshold 1232 may also move to the right so that both maximum warning threshold 1226 and maximum defuel threshold 1232 remain greater than or equal to maximum desired threshold 1220.

Figures 12E, 12F:
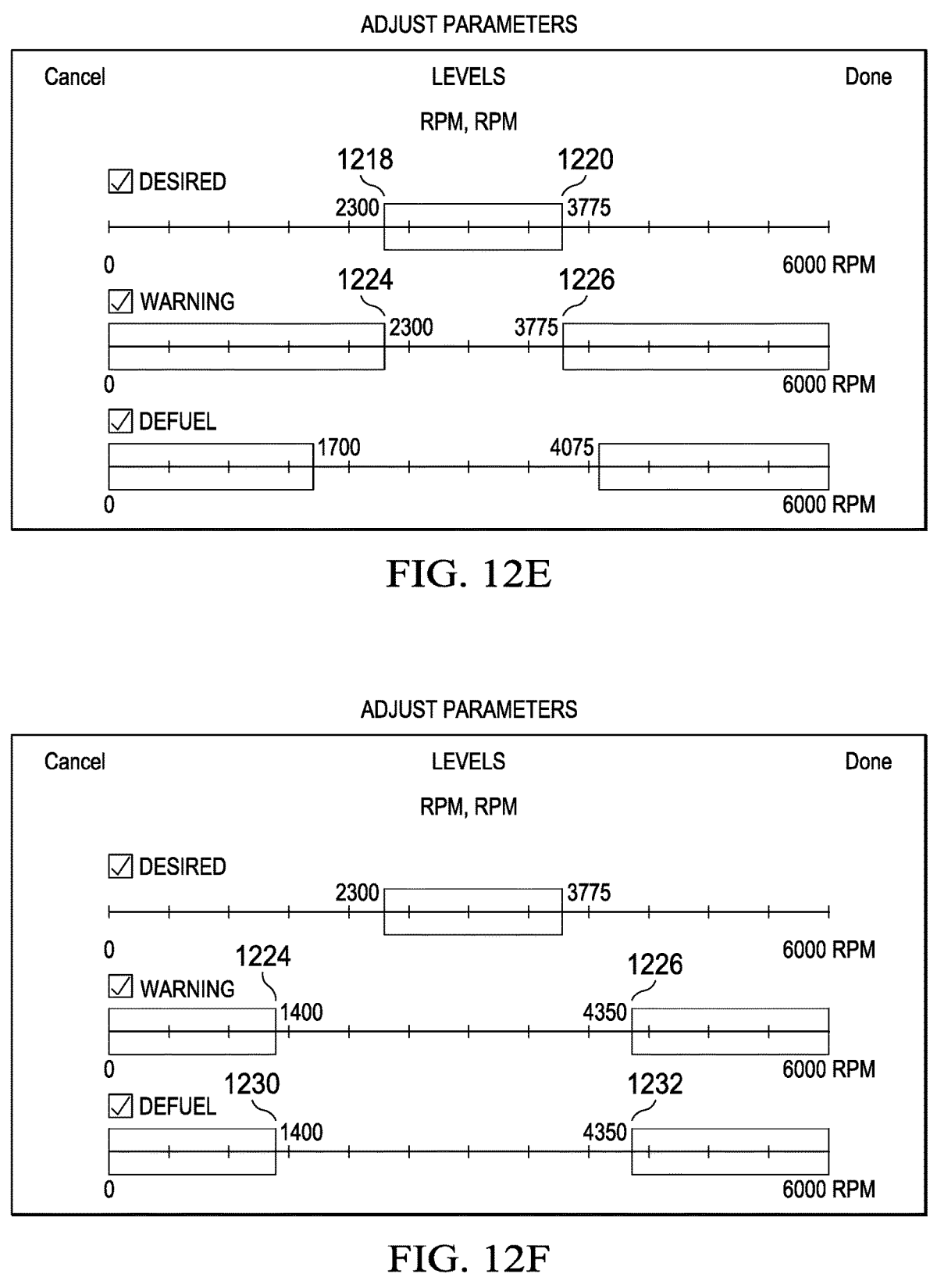

Referring to FIG. 12E, when minimum warning threshold 1224 is dragged to the right, minimum desired threshold 1218 may also move to the right so that minimum desired threshold 1218 remains greater than or equal to minimum warning threshold 1224.

When maximum warning threshold 1226 is dragged to the left, maximum desired threshold 1220 may also move to the left so that maximum desired threshold 1220 remains less than or equal to maximum warning threshold 1226.

Referring to FIG. 12F, when minimum warning threshold 1224 is dragged to the left, minimum defuel threshold 1230 may also move to the left so that minimum defuel threshold 1230 remains less than or equal to minimum warning threshold 1224.

When maximum warning threshold 1226 is dragged to the right, maximum defuel threshold 1232 may also move to the right so that maximum defuel threshold 1232 remains greater than or equal to maximum warning threshold 1226.

Figure 12G:
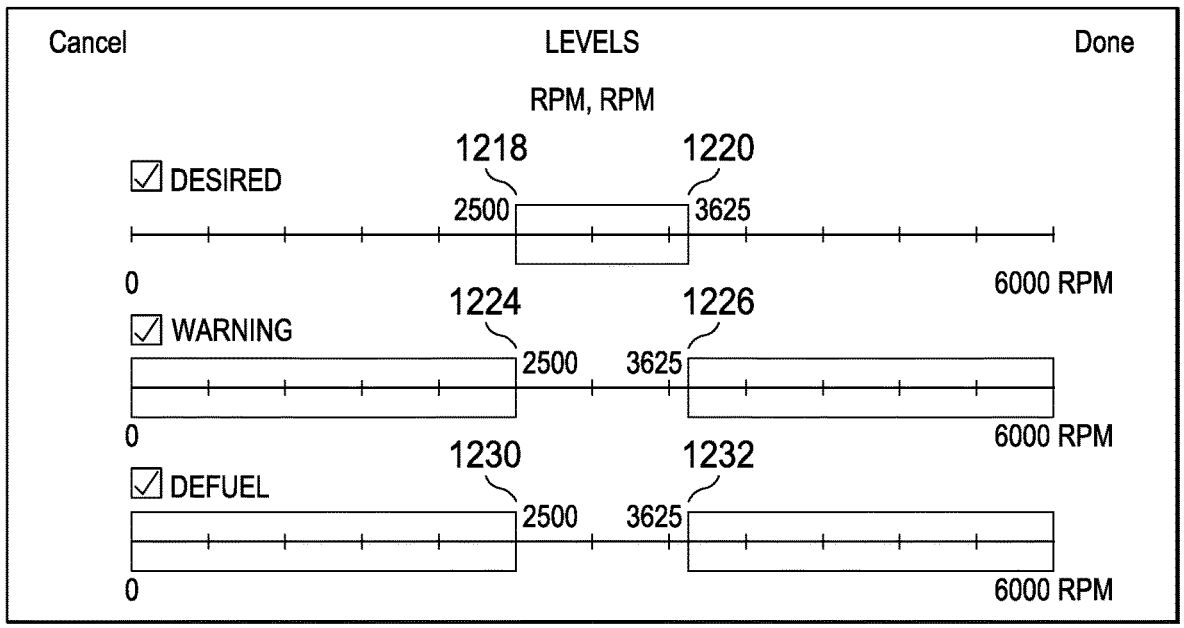

Referring to FIG. 12G, when minimum defuel threshold 1230 is dragged to the right, minimum warning threshold 1224 and minimum desired threshold 1218 may also move to the right so that both minimum warning threshold 1224 and minimum desired threshold 1218 remain greater than or equal to minimum defuel threshold 1230.

When maximum defuel threshold 1232 is dragged to the left, maximum warning threshold 1226 and maximum desired threshold 1220 may also move to the left so that both maximum warning threshold 1226 and maximum desired threshold 1220 remain less than or equal to maximum defuel threshold 1232.

Figure 12H:
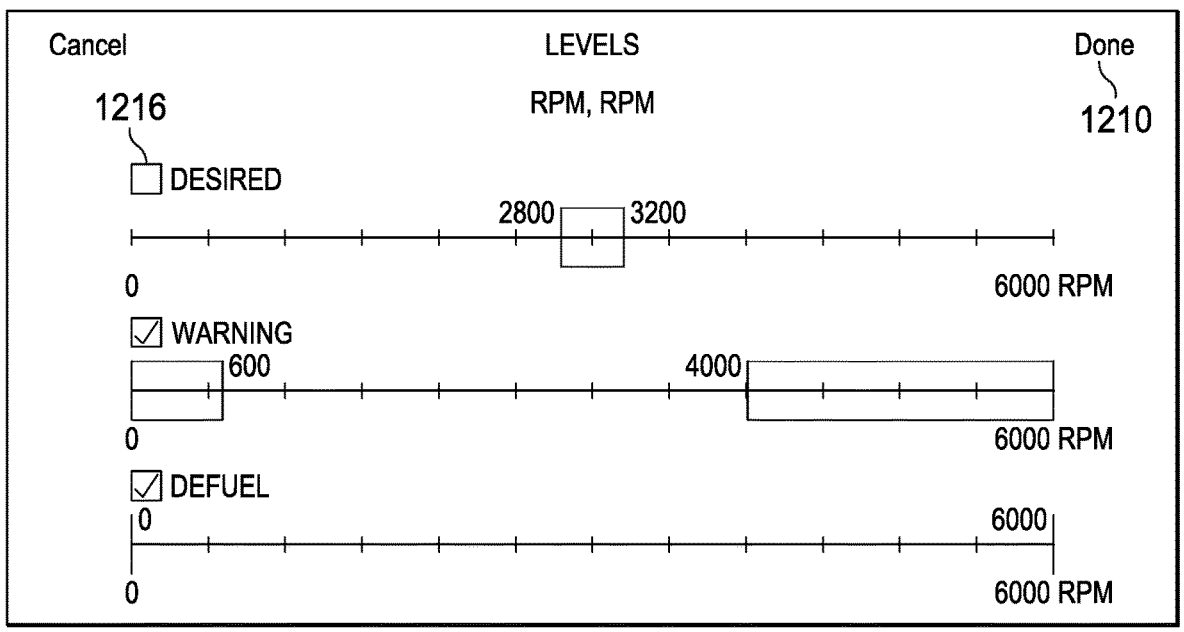
Figure 12I:
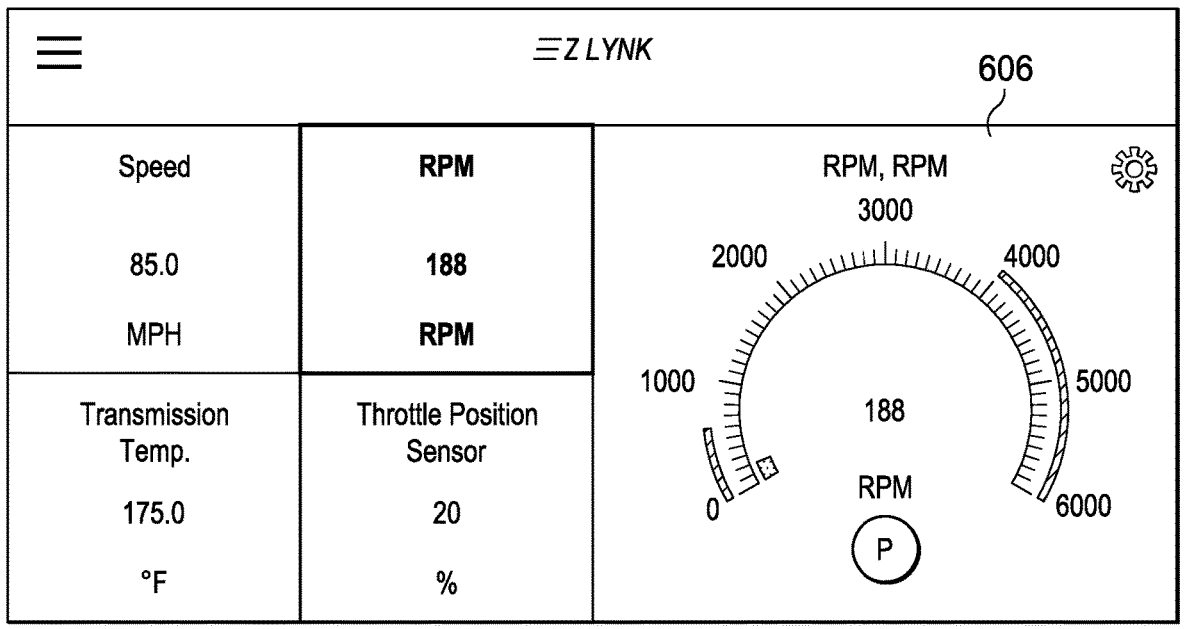

Referring to FIGS. 12H and 12I, when user interface element (checkbox) 1216 is unselected and user interface element (done button) 1210 is selected, then the desired section is not displayed on the selected gauge view 606, as shown in FIG. 12I.

Figure 13A:
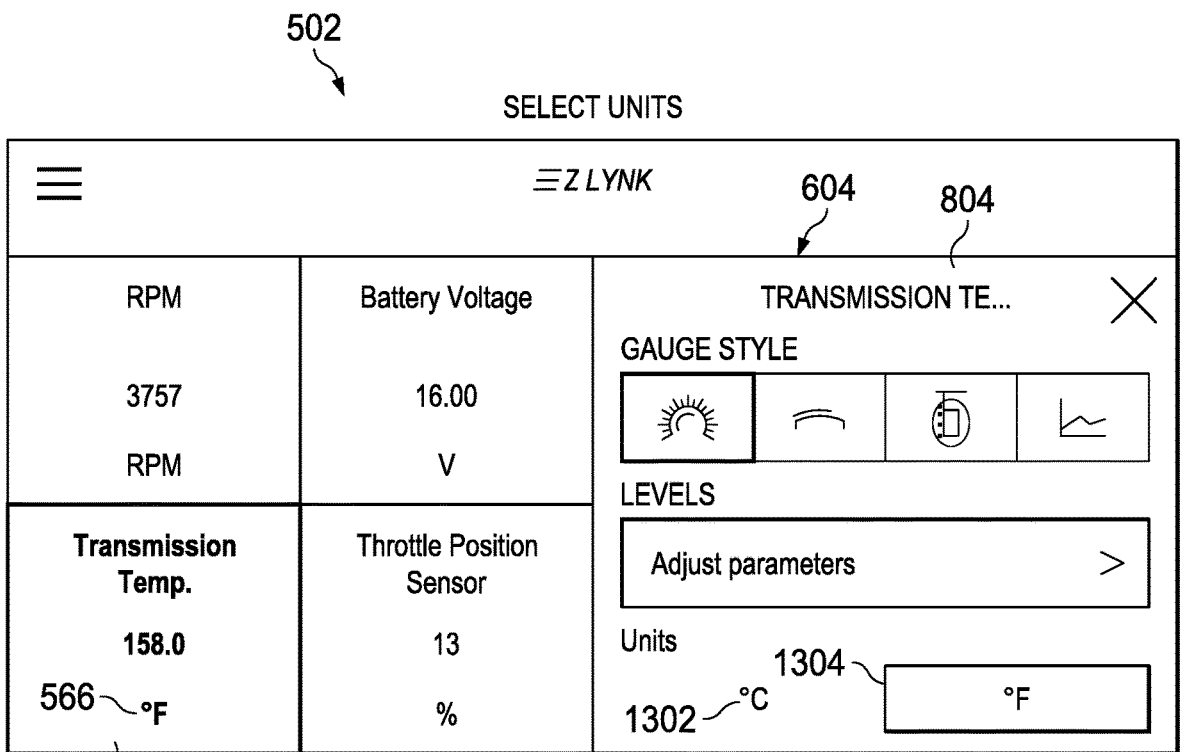

Referring to FIGS. 13A and 13B, user interface 502 displays multiple gauge view 604, mini gauge 518 has been selected, and settings view 804 is displayed. Settings view 804 includes user interface element 1302 and user interface element 1304.

User interface element 1302 and user interface element 1304 allow for the selection between different units for the PID values associated with mini gauge 518. In one embodiment, mini gauge 518 is associated with transmission temperature and can be displayed in degrees Celsius (° C.) upon the selection of user interface element 1302 or in degrees Fahrenheit (° F.) upon the selection of user interface element 1304.

Referring to FIGS. 14A through 14E, user interface 502 transitions from multiple (eight) gauge view 508 to multiple gauge view 1401. Multiple gauge view 1401 may also be referred to as five gauge view 1401. The transition from eight gauge view 508 to five gauge view 1401 occurs when there is a slide or drag event that drags eight gauge view 508 up to reveal five gauge view 1401. Additionally, the transition from five gauge view 1401 to eight gauge view 508 occurs when there is a slide or drag event that drags five gauge view 1401 down to reveal eight gauge view 508.

Figure 14B:
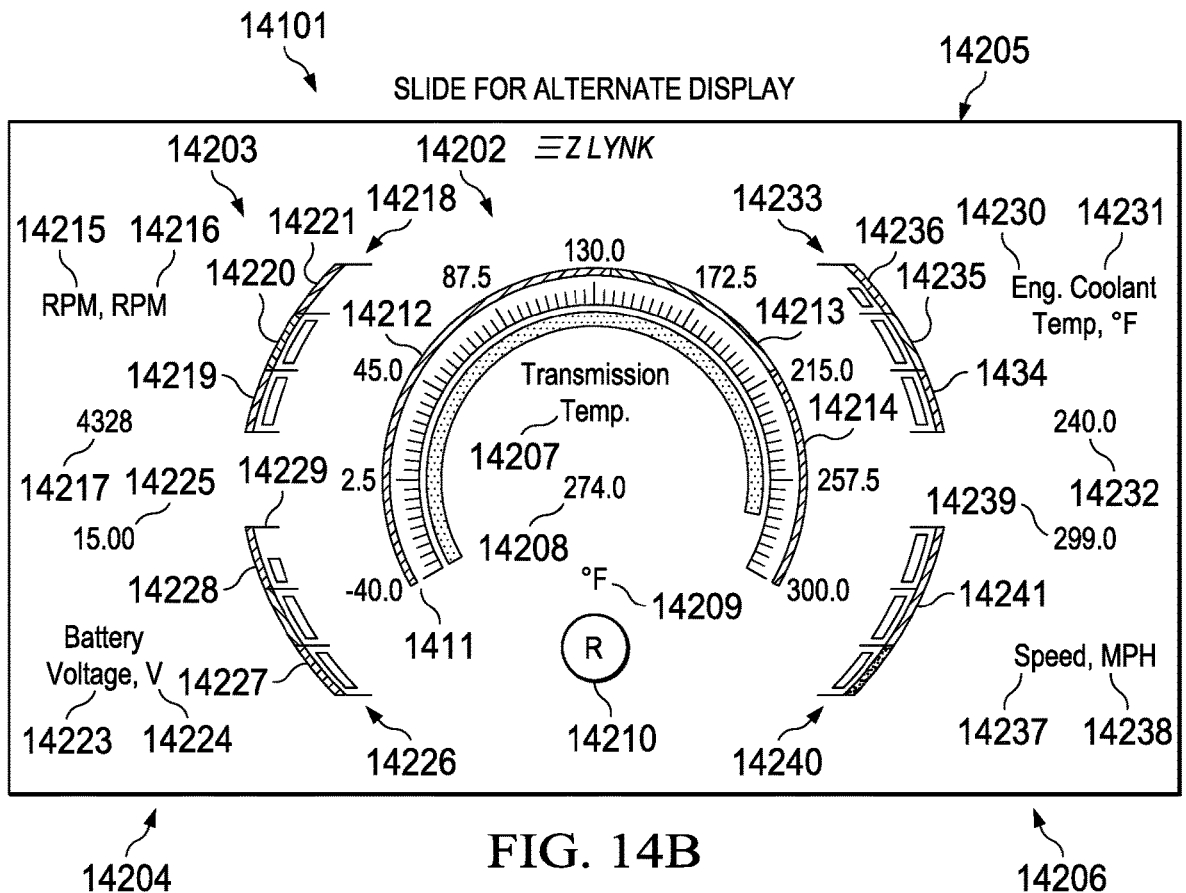

Referring to FIG. 14B, five gauge view 14101 includes gauge views 14202, 14203, 14204, 14205, and 14206, which may be referred to as large center gauge view 14202, top left gauge view 14203, bottom left gauge view 14204, top right gauge view 14205, and bottom left gauge view 14206.

Large center gauge view 14204 includes name 14207, value 14208, units 14209, gear 14210, and circular gauge view 14211. Circular gauge view 14211 includes lower warning section 14212, desired section 14213, and upper warning section 14214. Large center gauge view 14204 indicates that the vehicle is in reverse and that the transmission temperature is 274.0° F. and is in a warning range that is above the desired range.

Top left gauge view 14203 includes name 14215, units 14216, value 14217, and arc gauge view 14218. Arc gauge view 14218 includes lower warning section 14219, desired section 14220, and upper warning section 14221. Top left gauge view 14203 indicates that the RPM of the motor is 4328 RPM, which is just above the desired range an in the upper warning range.

Bottom left gauge view 14204 includes name 14223, units 14224, value 14225, and arc gauge view 14226. Arc gauge view 14226 includes lower warning section 14227, desired section 14228, and upper warning section 14229. Bottom left gauge 14204 indicates that the battery voltage is 15.00 V and is in the upper warning range.

Top right gauge view 14205 includes name 14230, units 14231, value 14232, and arc gauge view 14233. Arc gauge view 14233 includes lower warning section 14234, desired section 14235, and upper section 14236. Top right gauge 14205 indicates that the engine coolant temperature is 240.0° F. and is in the upper warning section above the desired level.

Bottom right gauge view 14206 includes name 14237, units 14238, value 14239, and arc gauge view 14240. Arc gauge view 14240 includes warning section 14241 that indicates which values are too high. Bottom right gauge 14206 indicates that the speed of the vehicle is 299.0 MPH and is in the upper warning range.

Figure 14C:
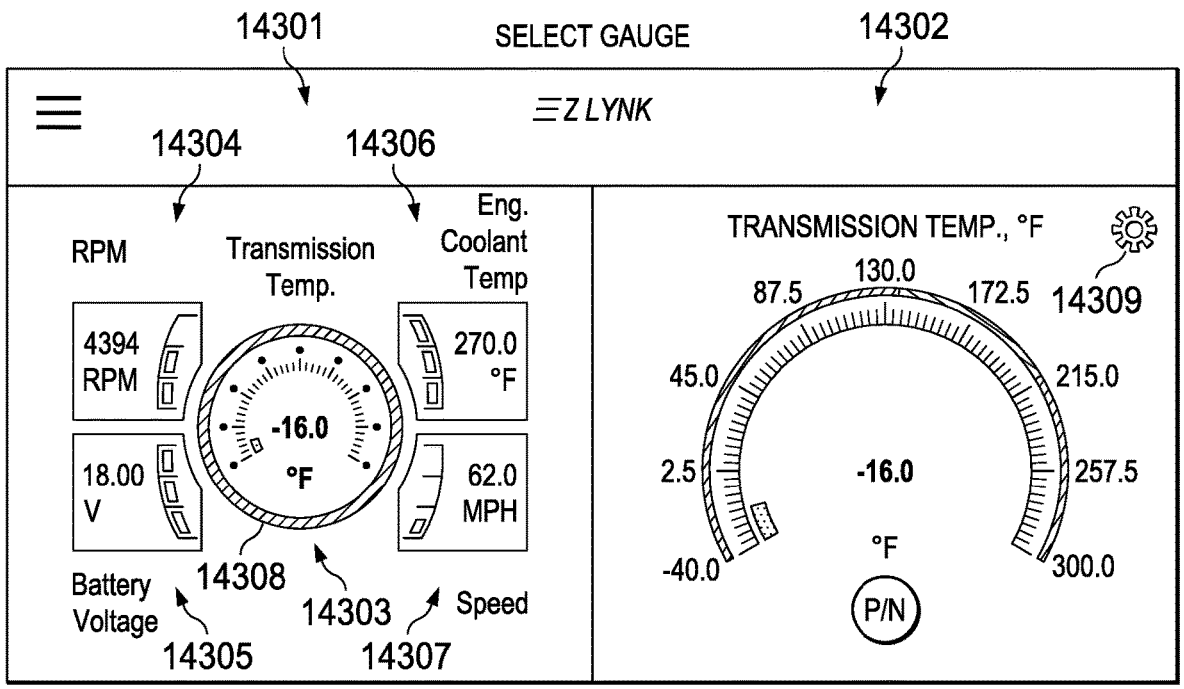

The names, units, and values displayed on the gauges in large five gauge view 14101 are each shaded in red to indicate that each of the values of each of the gauges is in a warning section When any one of gauge views 14202, 14203, 14204, 14205, and 14206 are selected from large five gauge view 14101, user interface 502 transitions from displaying large five gauge view 14101 to multiple gauge view 14301 and selected gauge view 14302, shown in FIG. 14C. Multiple gauge view 14301 may also be referred to as small five gauge view 14301.

Referring to FIG. 14C, small five gauge view 14301 includes gauge views 14303, 14304, 14305, 14306, and 14307, which may be referred to as small center gauge view 14303, top left gauge view 14304, bottom left gauge view 14305, top right gauge view 14306 and bottom right gauge view 14307. Gauge views 14303, 14304, 14305, 14306, and 14307 from small five gauge view 14301 are associated with the same PIDs as gauge views 14202, 14203, 14204, 14205, and 14206 from large five gauge view 14101 of FIG. 14B respectively. The values for gauge views 14303, 14304, 14305, 14306, and 14307 are continuously updated to reflect the current state of the engine.

Selected gauge view 14302 of FIG. 14C is similar to selected gauge view 606 of FIG. 6 and is associated with small center gauge 14303. Small center gauge view 14303 includes outline 14308 to indicate that small center gauge view 14303 is the gauge view that is linked to or associated with selected gauge view 14302 and that large center gauge view 14202 may have been selected from multiple gauge view 14101 of FIG. 14B.

Figure 14D:
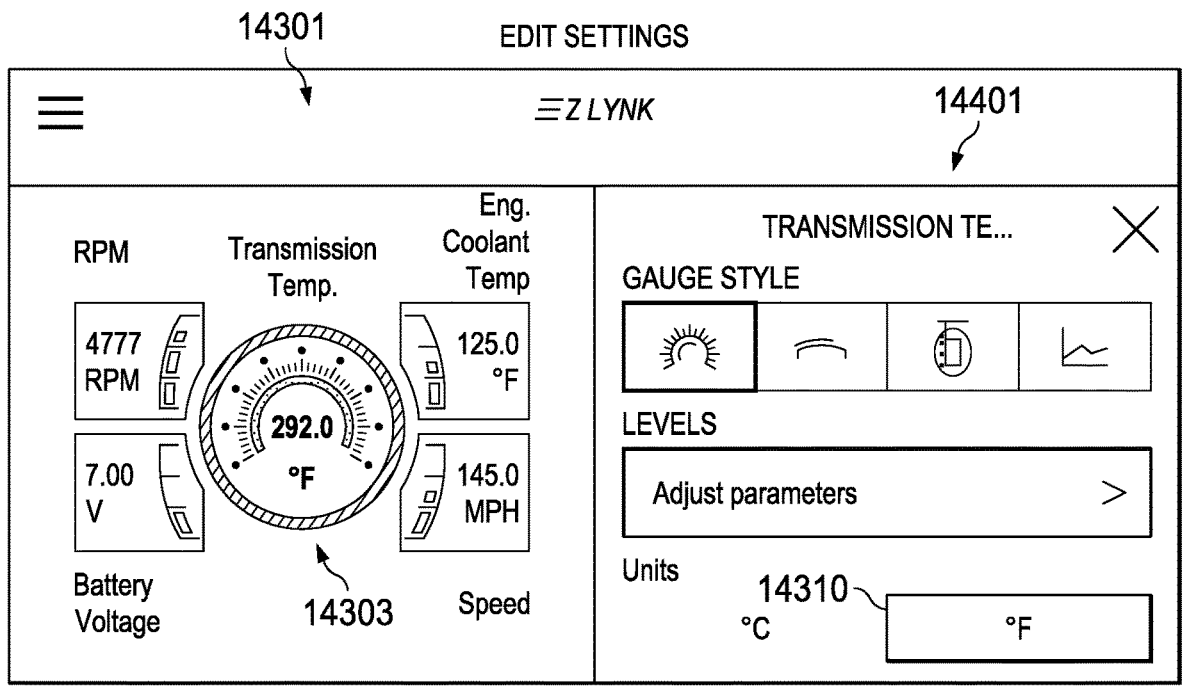
Figure 14E:
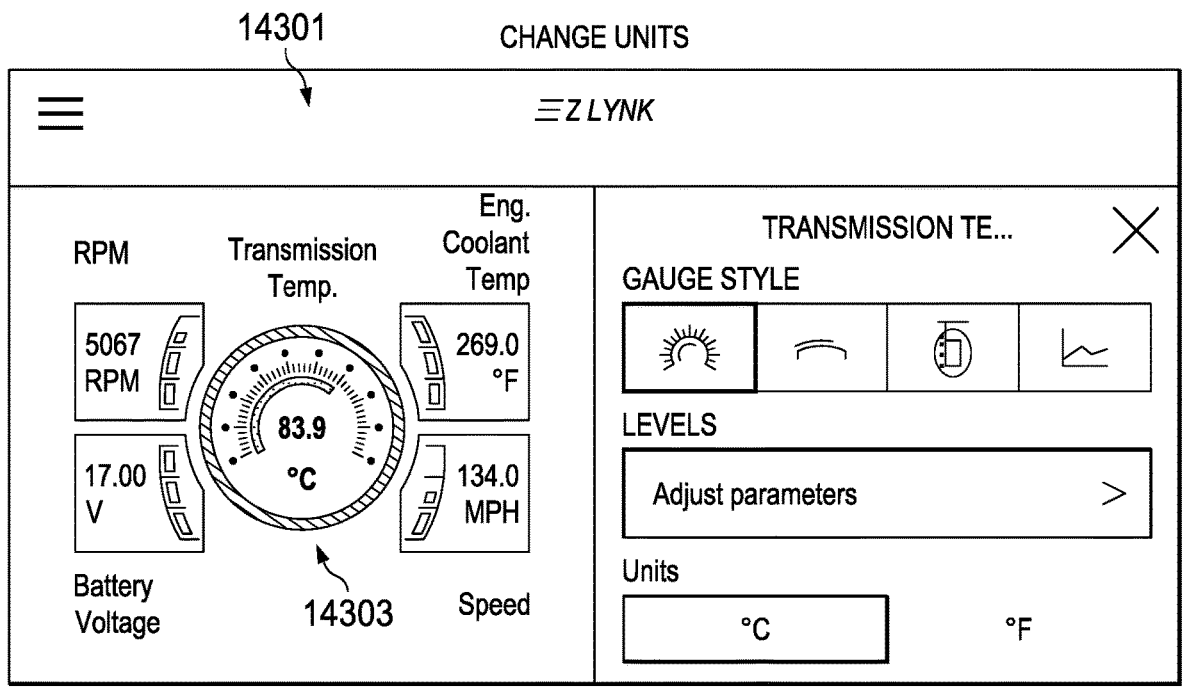

When user interface element 14309 of FIG. 14C is selected, user interface 502 transitions from displaying selected gauge view 14302 of FIG. 14C to displaying settings view 14401 of FIG. 14D. Settings view 14401 of FIG. 14D is similar to settings view 804 of FIG. 8.

Referring to FIG. 14D, degrees Fahrenheit (° F.) were originally selected and displayed on small center gauge view 14303. Upon selection of user interface element 14310, degrees Celsius (° C.) are selected and displayed on small center gauge view 14303.

Referring to FIGS. 15A to 15D, when selected gauge view 14302 is slid or dragged up, second selected gauge view 1502 is revealed. Additionally, small center gauge view 14303 that is associated with transmission temperature is updated to second small center gauge view 1504. Second small center gauge view 1504 is a Boost value that is 29.0 pounds per square inch (PSI).

Figure 15A:
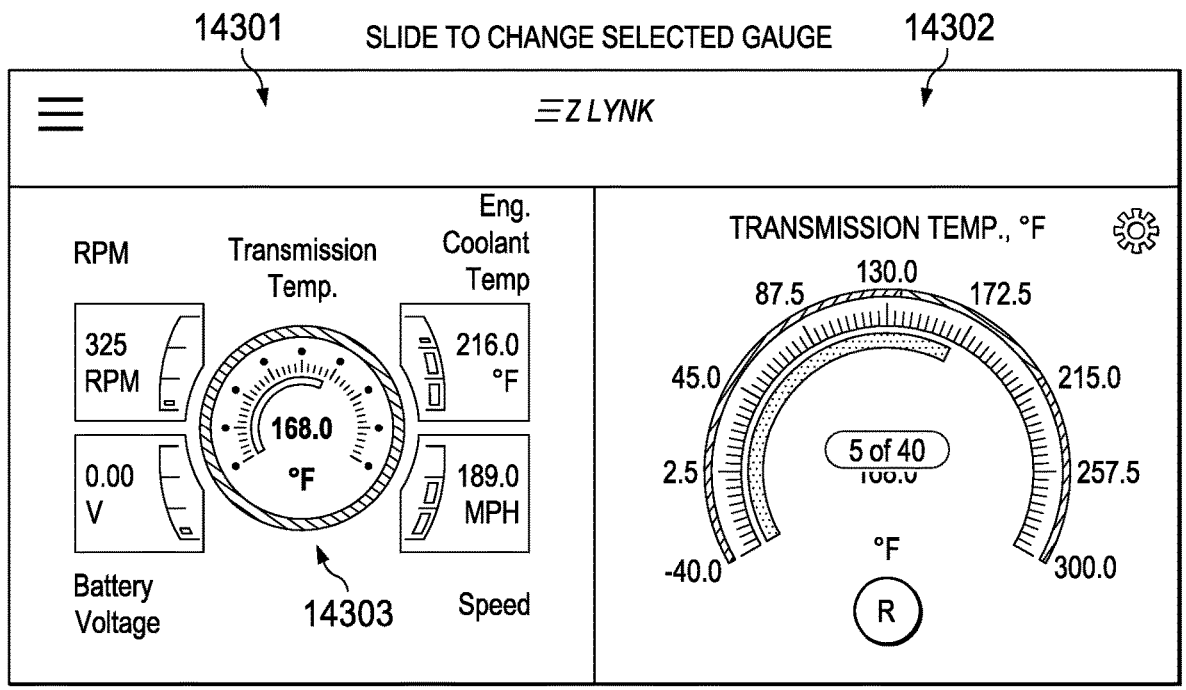
FIGS. 15A through 15D are diagrams of a user interface of a preferred embodiment for selecting gauges for a multiple gauge view.
Figure 15B:
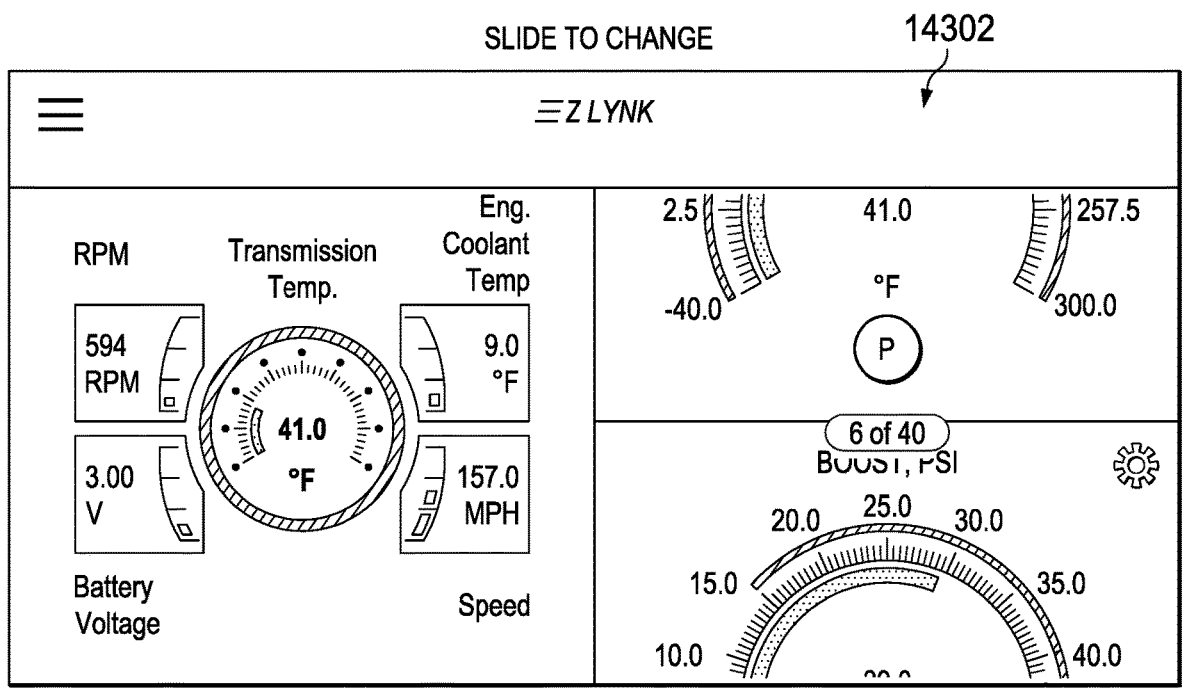
Figure 15C:
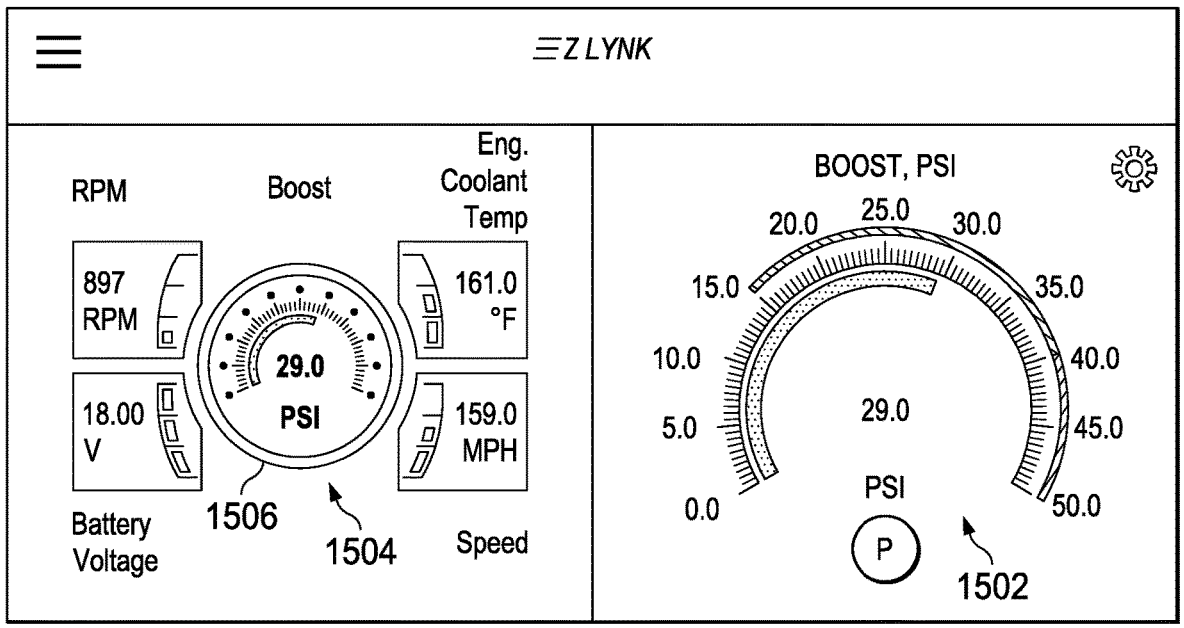
Figure 15D:
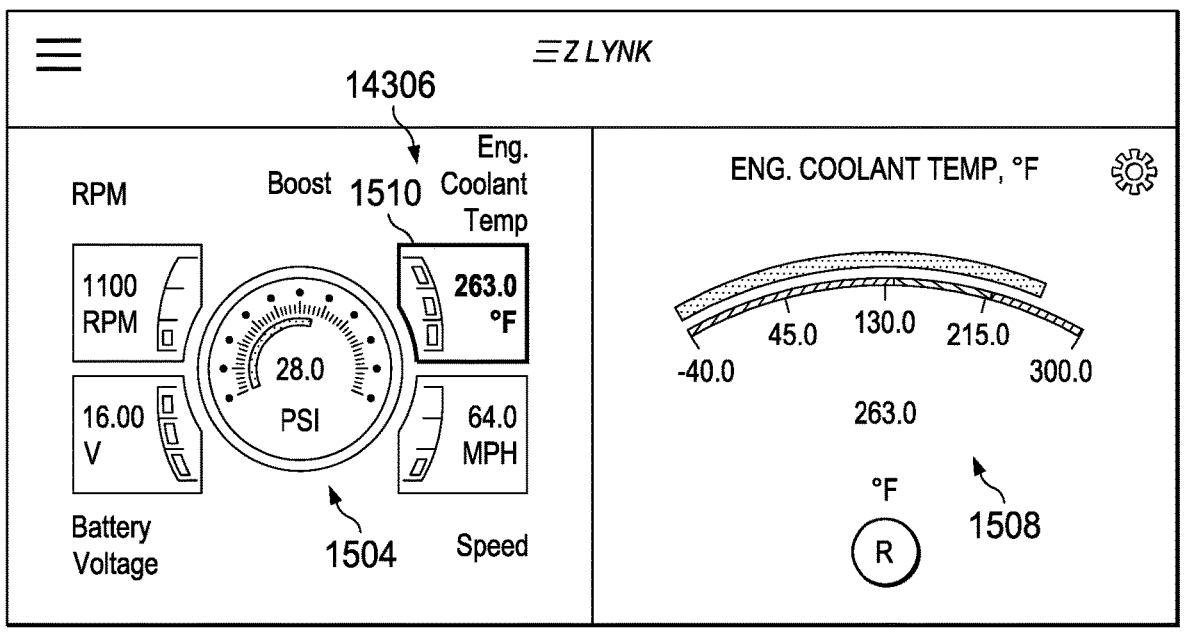

Upon selection of small top right gauge view 14306 in FIG. 15D, selected gauge view 1502 of FIG. 15C is updated to selected gauge view 1504 of FIG. 15D. Selected gauge view 1504 shows the same PID information as small top right gauge view 14306. Small top right gauge view 14306 is updated to include outline 1510 and outline 1506 around small center gauge view 1504 is removed.

Figure 16A:
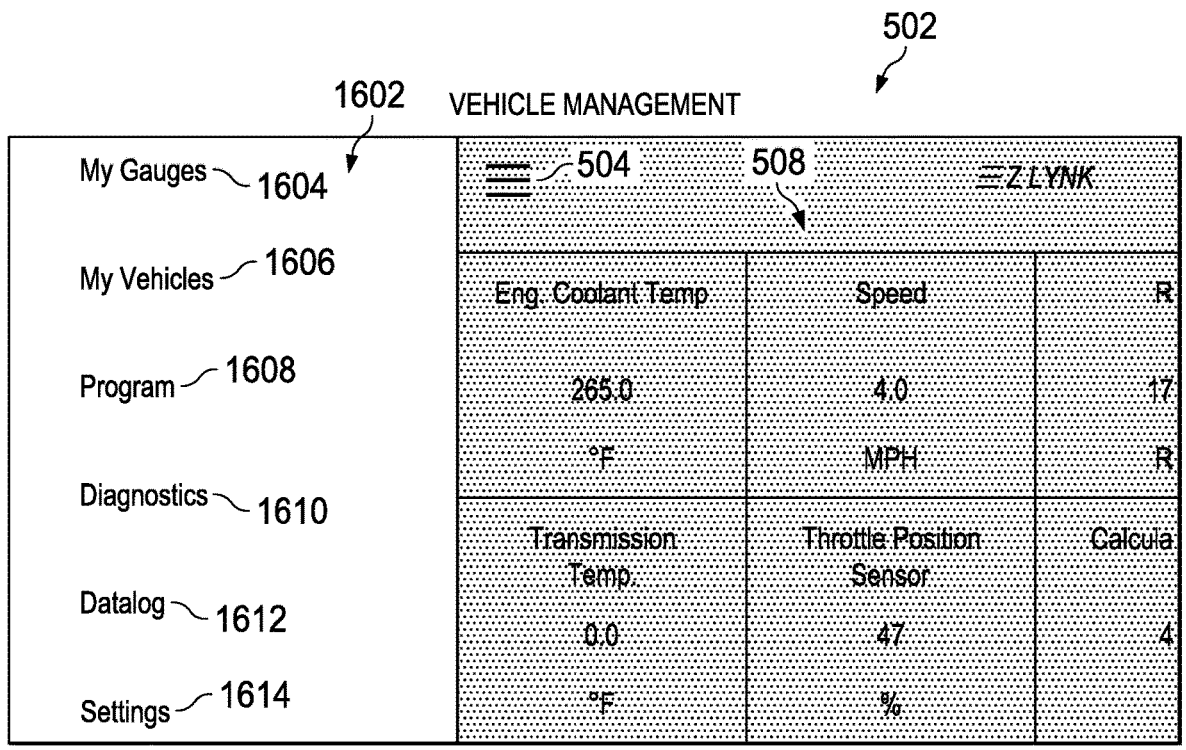
FIGS. 16A through 16E are diagrams of a user interface of a preferred embodiment for vehicle management.

Referring to FIG. 16A, menu button 504 is selected. Eight gauge view 508 slides partially to the right and down and is made more transparent to enhance the display of menu 1602. Menu 1602 includes user interface elements 1604, 1606, 1608, 1010, 1012, and 1614, which may also be referred to as "My Gauges" button 1604, "My Vehicles" button 1606, "Program" button 1608, "Diagnostics" button 1610, "Datalog" button 1612, and "Settings" button 1614.

Selecting button 1604 removes menu 1602 and brings back the most recent gauge view, which in FIG. 16A is eight gauge view 508.

Figure 16B:
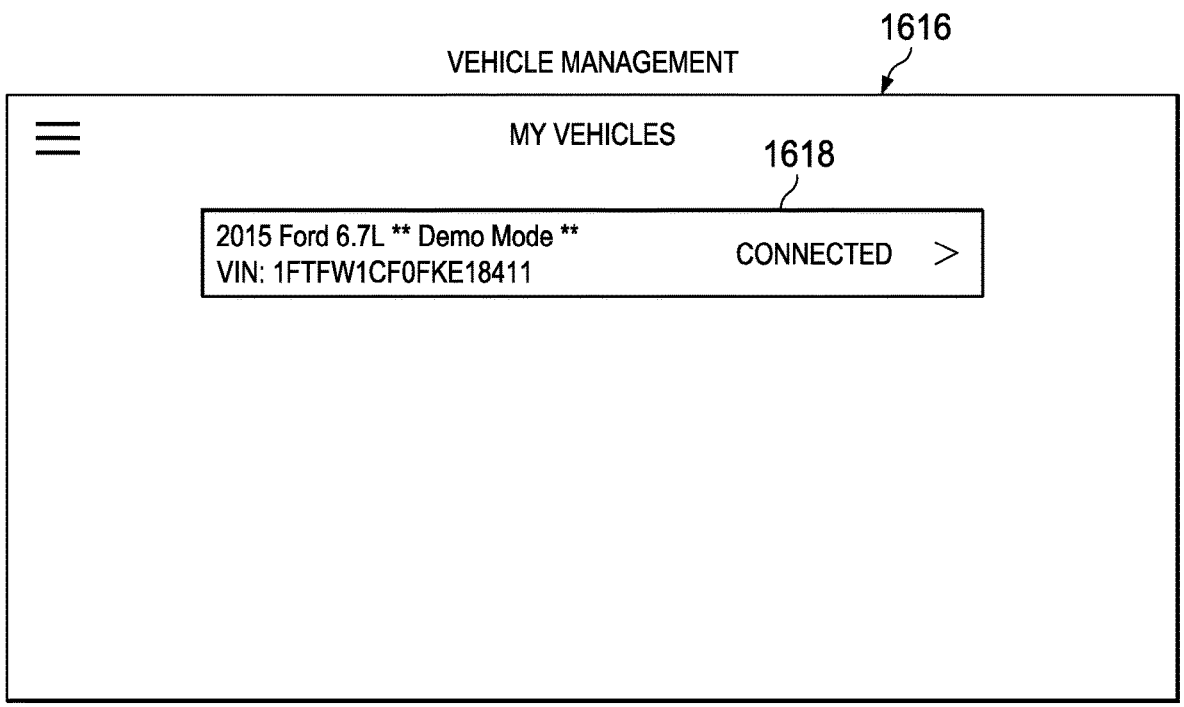
Figure 16C:
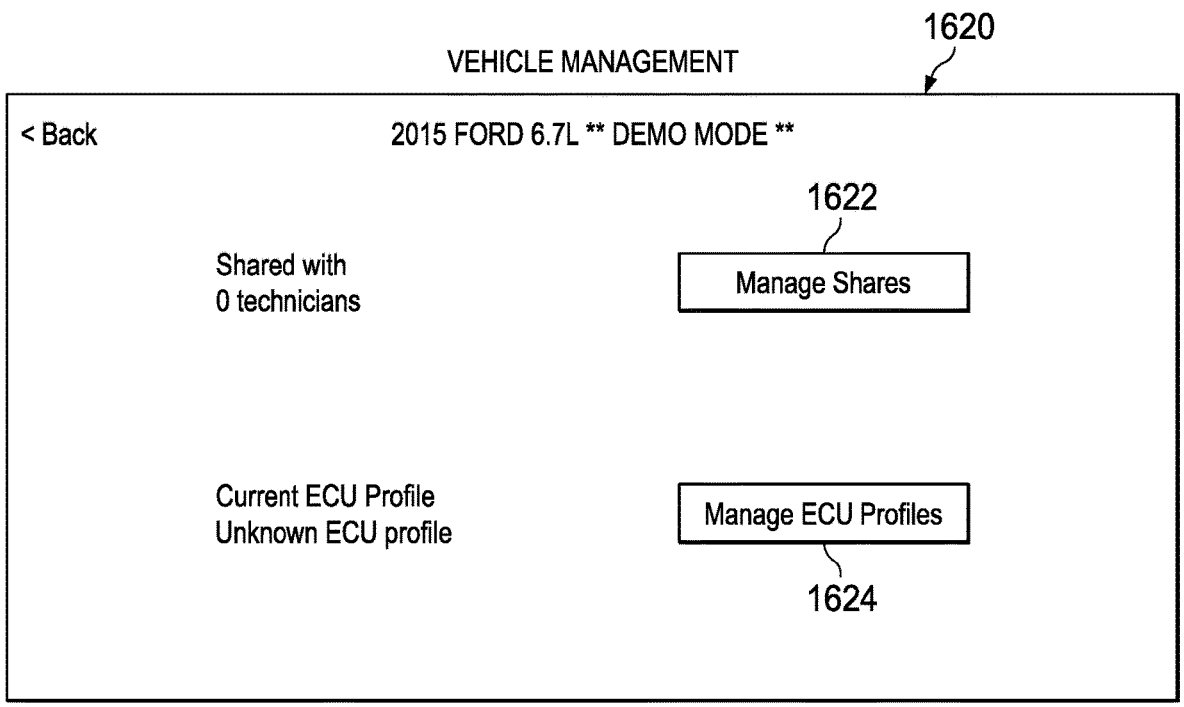

Selecting button 1606 removes menu 1602 and transitions user interface 502 to view 1616 of FIG. 16B. View 1616 may also be referred to as "My Vehicles" view 1616, includes a user interface element for each vehicle that has been associated with the client device app. User interface element 1618 includes the year, make, and model of the vehicle and indicates that the local device is attached to the vehicle associated with user interface Upon selecting user interface element 1618, user interface 502 transitions to view 1620 of FIG. 16C. View 1620 may also be referred to as vehicle view 1620, includes user interface elements 1622 and 1624, identifies the number of technicians to which the vehicle has been shared and identifies the current ECU profile.

Figure 16D:
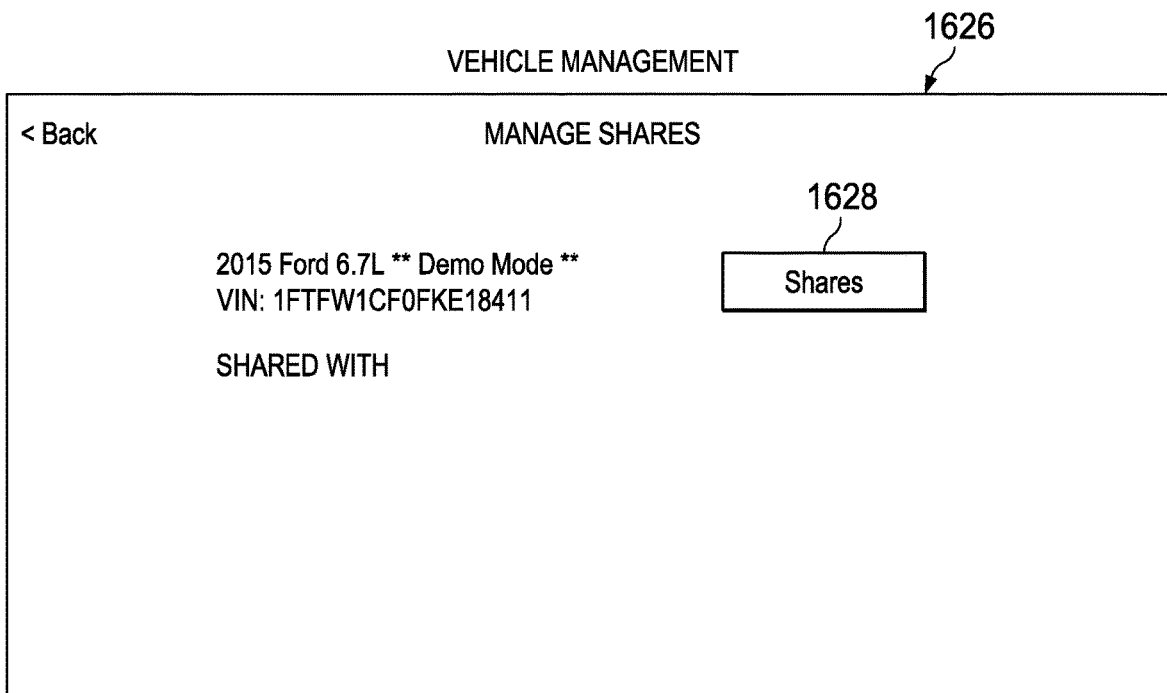

Upon selecting user interface element 1622, user interface 502 transitions to view 1626 of FIG. 16D. View 1626 may also be referred to as Manage Shares view 1626, includes user interface element 1628, and lists the technicians to which the vehicle has been shared in one or more user interface elements. As shown, in FIG. 16D, the vehicle has not been shared with any technicians.

Selecting user interface element 1624 brings up a different view (not shown) that allows for the management of ECU profiles. The management of ECU profiles includes: updating one or more parameters within a profile and deleting a profile from the client device.

Figure 16E:
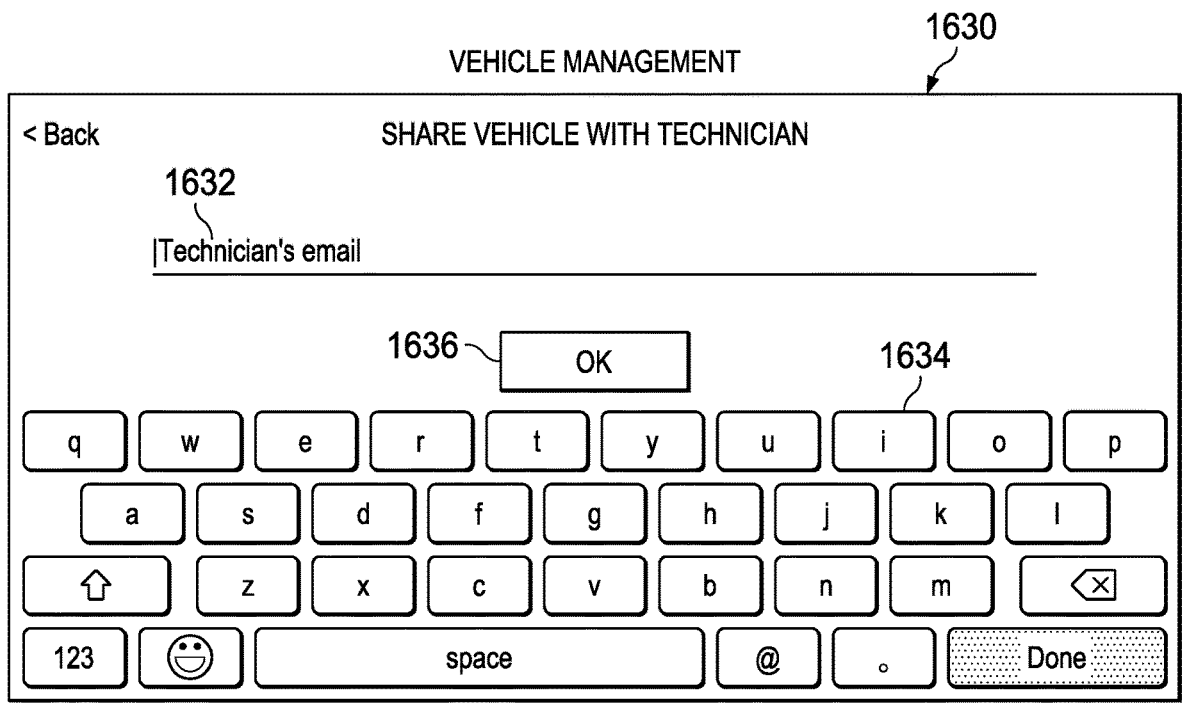

Upon selecting user interface element 1628, user interface 502 transitions to view 1630 of FIG. 16E. View 1630 may also be referred to as Manage Shares view 1630, includes user interface element 1632, keyboard 1634, and user interface element 1636. User interface element 1632 is an edit box that receives a technician's email address that acts as the login information to access a system server, such as system server 102 of FIG. 1.

In one embodiment, view 1630 of user interface 502 is displayed on a client device that is used by a technician that is diagnosing the car to allow the technician to log into the server. Upon selection of the "Done" button on keyboard 1634 or user interface element 1636, the client device app will attempt to login to the system server and associated (or share) the vehicle with the technician's client device.

In an alternative embodiment, view 1630 of user interface 502 is displayed on a client device that is used by the owner of the vehicle that is being diagnosed. Upon selection of the "Done" button on keyboard 1634 or user interface element 1636, the client device app will send the technician's email address to the server, which will then allow the technician to log in and will then allow the vehicle information from the ODB2 port of the vehicle to be shared with a second client device that is operated by a technician. Sharing the vehicle information with the technician's client device allow the technician to diagnose the vehicle, even when the vehicle and the technician are remotely located.

Figure 17A:
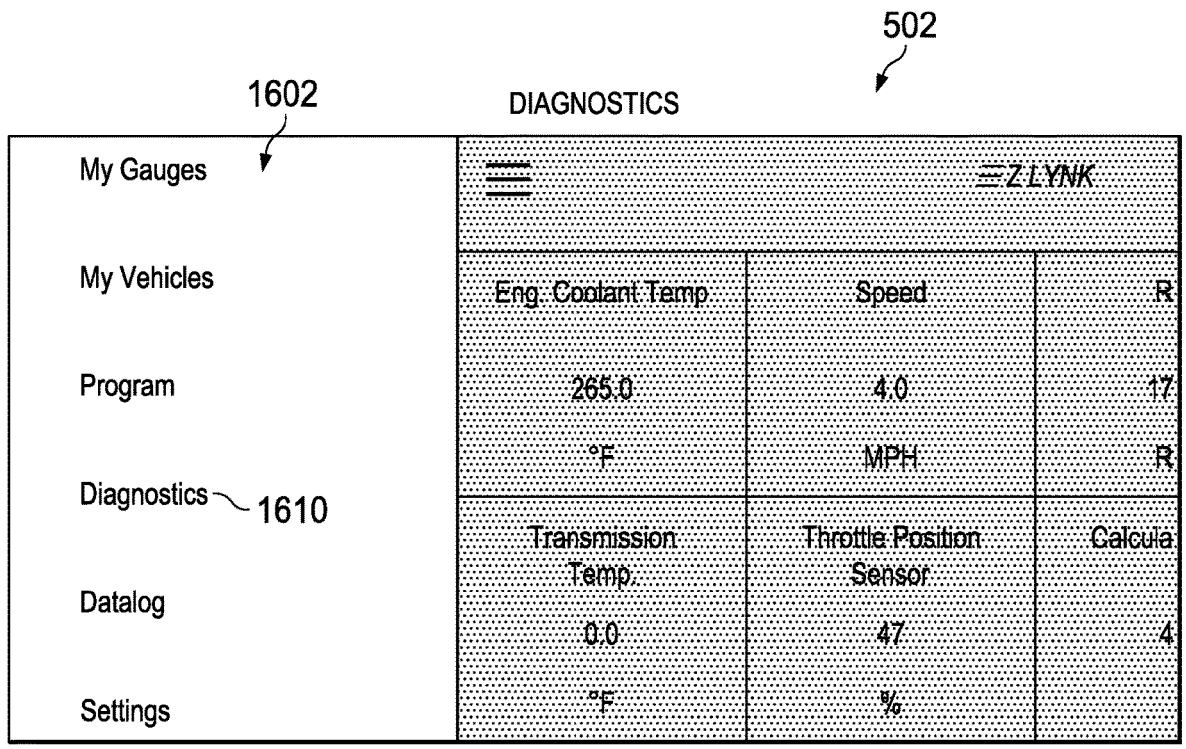
FIGS. 17A through 17C are diagrams of a user interface of a preferred embodiment for displaying diagnostics.
Figure 17B:
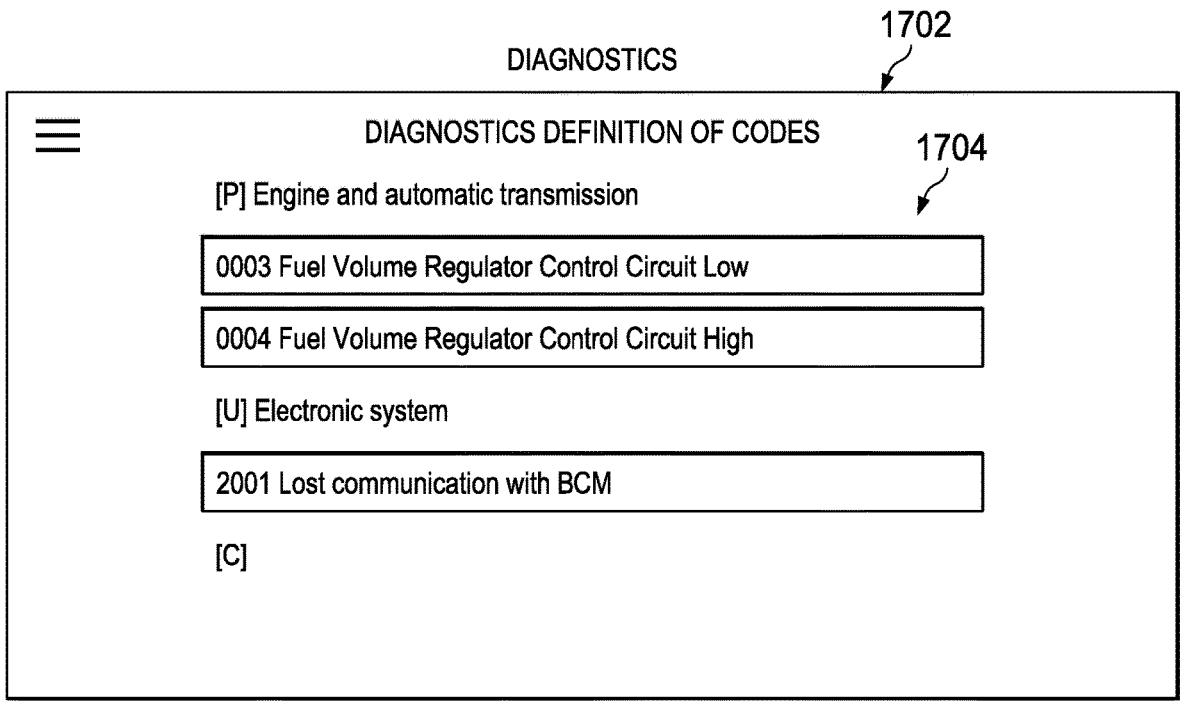
Figure 17C:
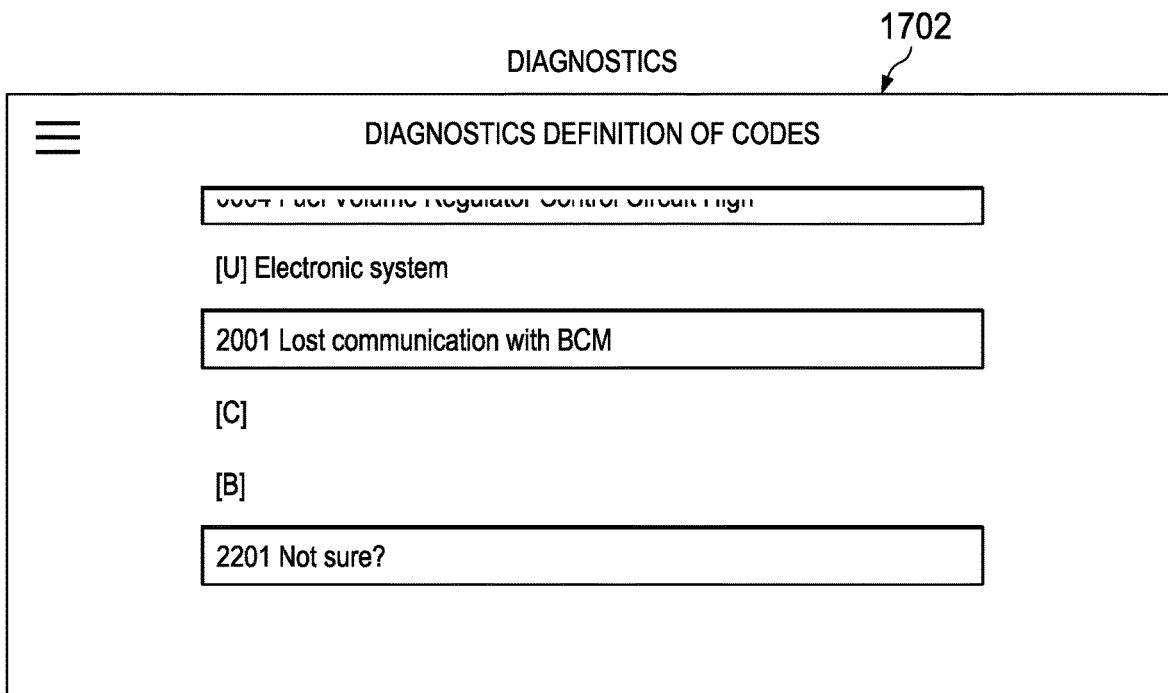

Referring to FIGS. 17A, 17B, 17C, upon selection of user interface element 1610 from menu 1602, user interface 502 displays view 1702. View 1702 may be referred to as diagnostics view 1702 and displays list 1704 of diagnostic codes with a text description of the code. List 1704 is a list that can be scrolled up and down to show more than one page of information. FIG. 17B shows the top of list 1704 and FIG. 17C shows the bottom of list 1704.

Figure 18A:
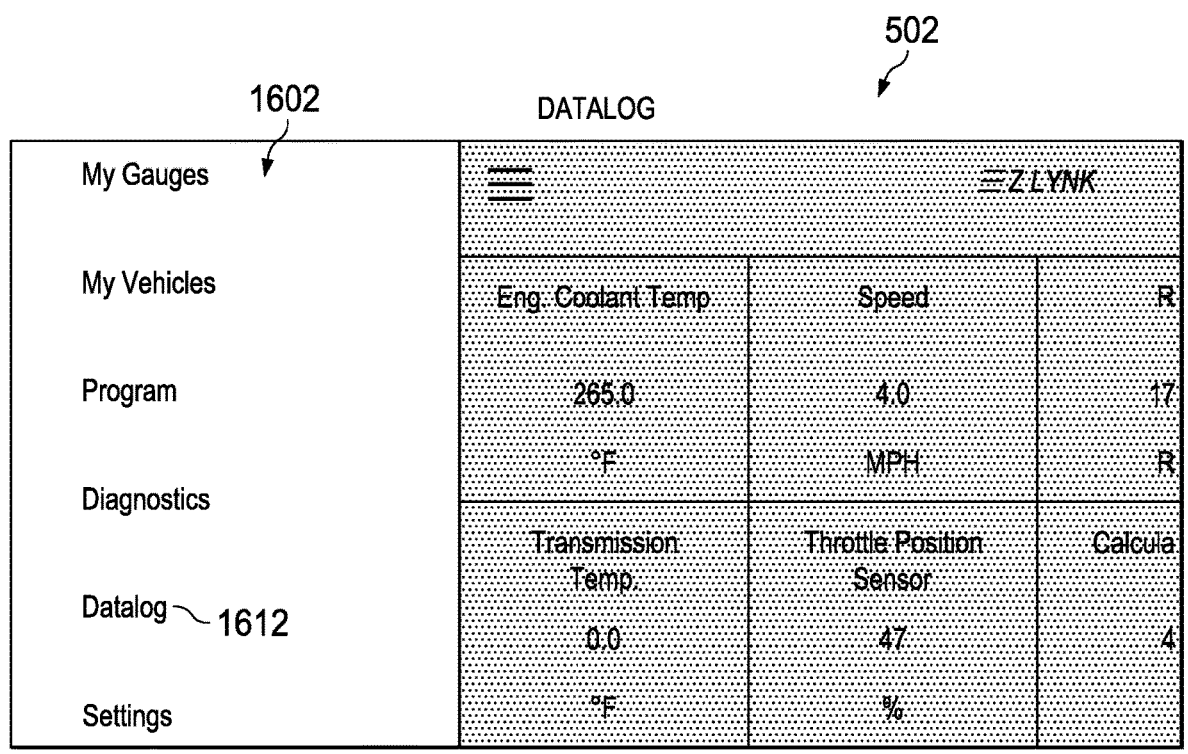
FIGS. 18A and 18B are diagrams of a user interface of a preferred embodiment for data log management.
Figure 18B:
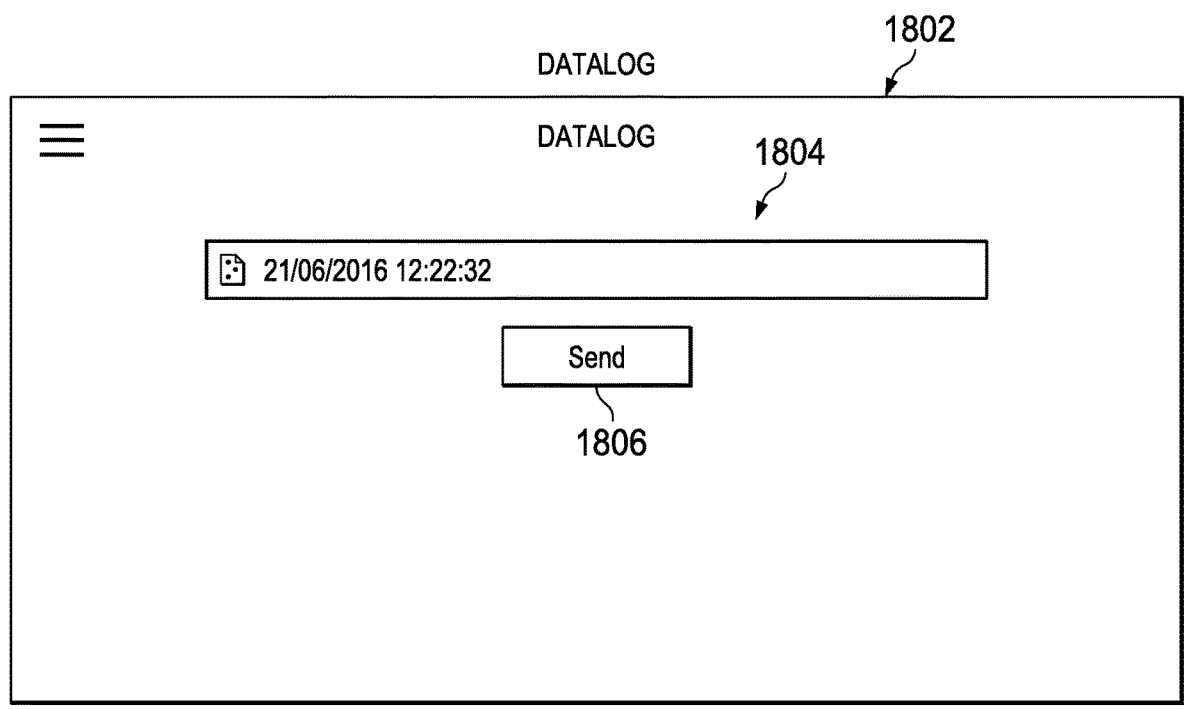
Figure 19A:
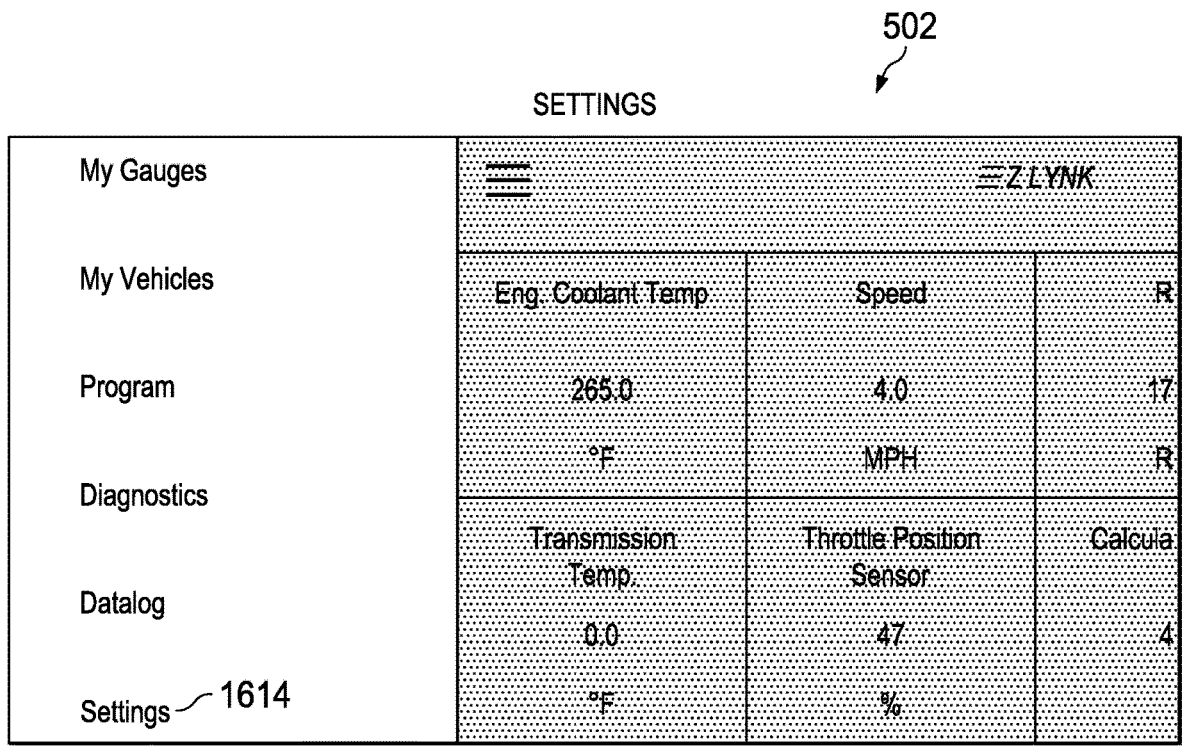
FIGS. 19A through 19D are diagrams of a user interface of a preferred embodiment for settings management.
Figure 19B:
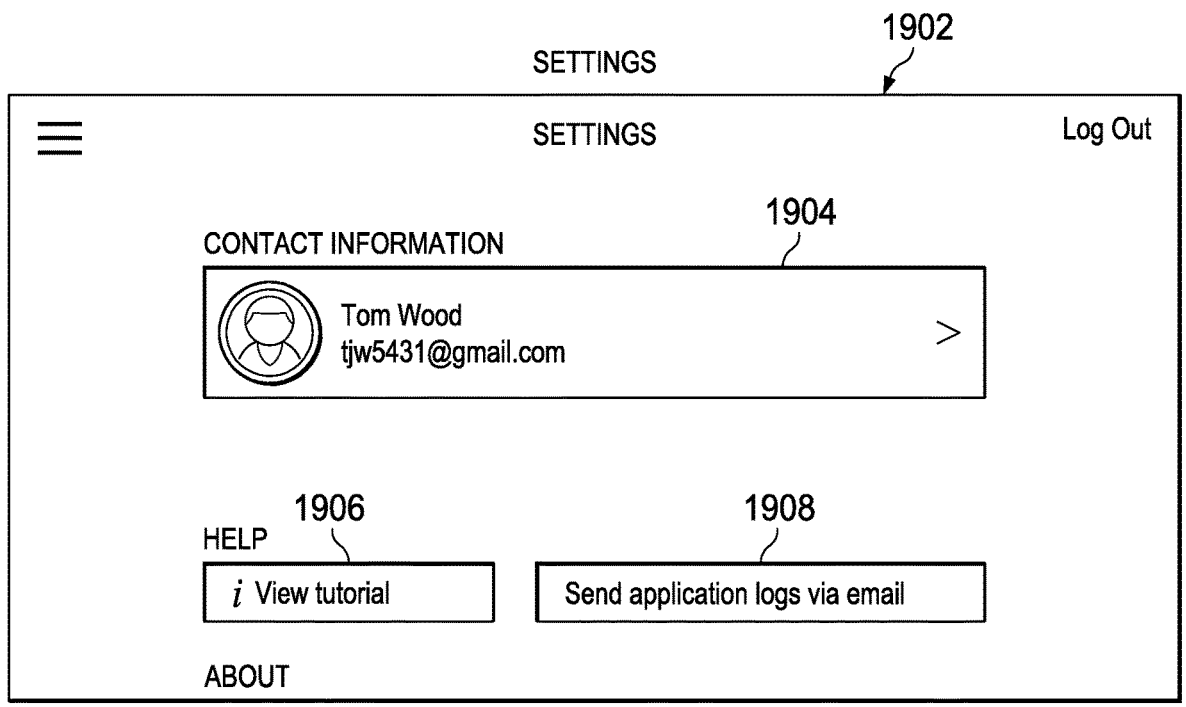
Figure 19C:
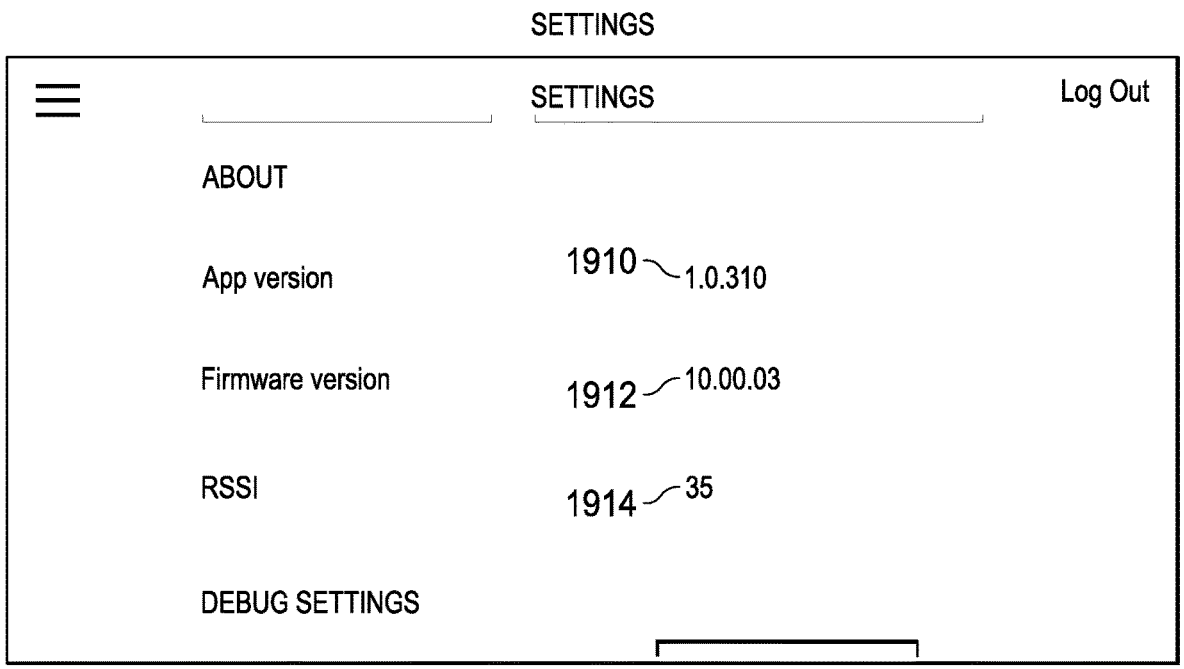
Figure 19D:
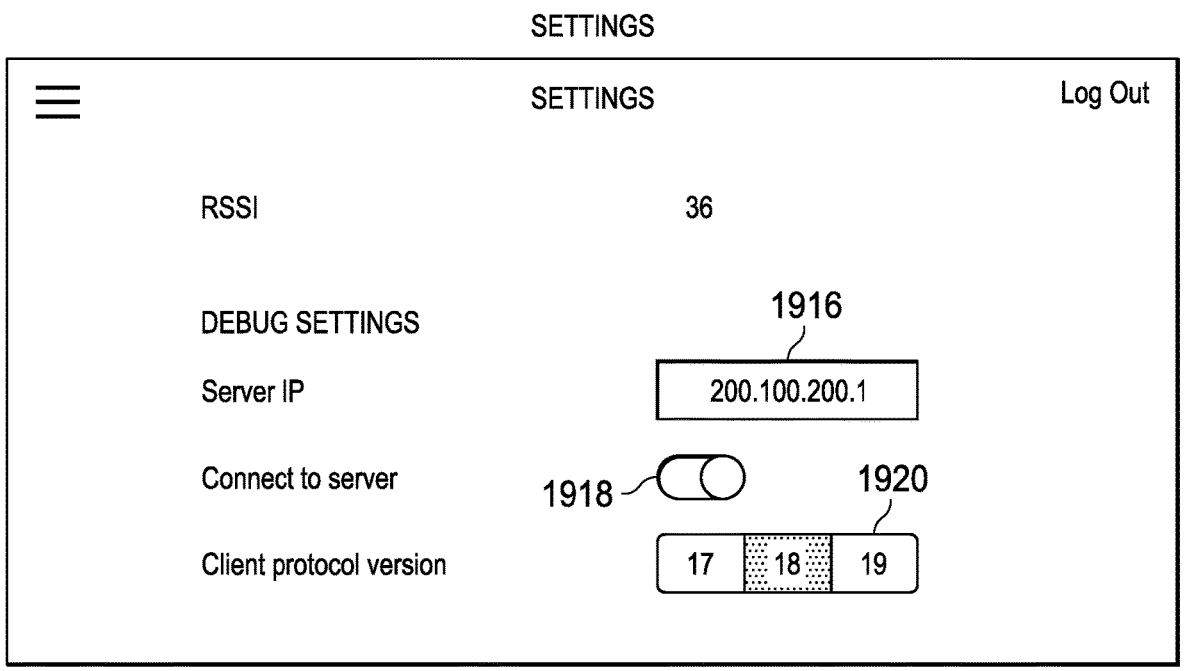

Referring to FIGS. 18A and 18B, upon selection of user interface element 1612 from menu 1602, user interface 502 displays view 1802. View 1802, which may be referred to as "Datalog" view 1802, displays list 1804 of data logs, below which is user interface element 1806. List 1804 is a scrollable list that shows the data logs that can be sent to the system server. The data logs store information received by the client device from the local device that the local device received from the automotive controller. Selecting user interface element 1806 sends a data log that has been selected from list 1804 to the system server.

Referring to FIGS. 19A, 19B, 19C, and 19D, upon selection of user interface element 1614, user interface 502 displays view 1902. View 1902, which may also be referred to as "Settings" view 1902, displays one or more user interface elements that allow the user of the app to view and control various settings related to the app.

User interface element 1904 displays contact information including a name and an email address. When user interface element 1904 is selected, user interface 502 displays another view (not shown) that allows the user to view and manipulate the contact information, which also includes a phone number and a birthday. The contact information is used by the technician to contact the owner of the vehicle that the local device is connected to.

When selected, user interface element 1906 displays one or more videos that show how to use the client device app.

User interface element 1908 is for the development of the client device application itself. When user interface element 1908 selected, the client device app will send the log of information recorded by the client device app via an email to the contact identified in user interface element 1904.

User interface element 1910 displays the version of the client device app that is currently running.

User interface element 1912 displays the version of the firmware running on the local device that is currently running.

User interface element 1914 displays a receive signal strength indicator (RSSI) that indicates the strength of the wireless signal that is sent by the local device and received by the client device.

User interface element 1916 is an edit box that contains the internet protocol (IP) address that the client device will use to connect to the server running on the local device.

User interface element 1918 is a binary selector switch that, when enabled, allows the app to connect to the server running on the local device.

User interface element 1920 is a multiple position single selector switch that is used to select which protocol version that the client device app will use to communicate with the server running on the local device.

Figure 20A:
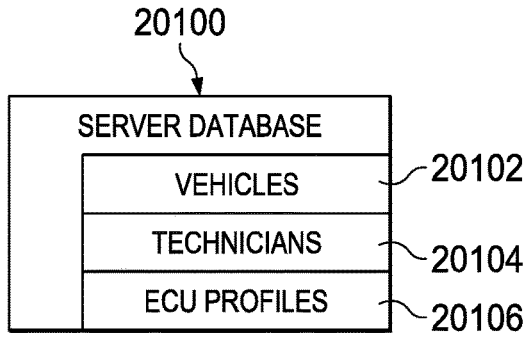
FIGS. 20A through 20D are diagrams of databases and records of a preferred embodiment.

Referring to FIG. 20A, server database 20100 is an embodiment of database 106 that is accessed by system server 102 of FIG. 1. Server database 20100 comprises one or more records, which may themselves be databases. The records can be stored on any device of the system. In one embodiment, server database 20100 includes records for vehicles 20102, technicians 20104, and engine control unit (ECU) profiles 20106.

Figure 20B:
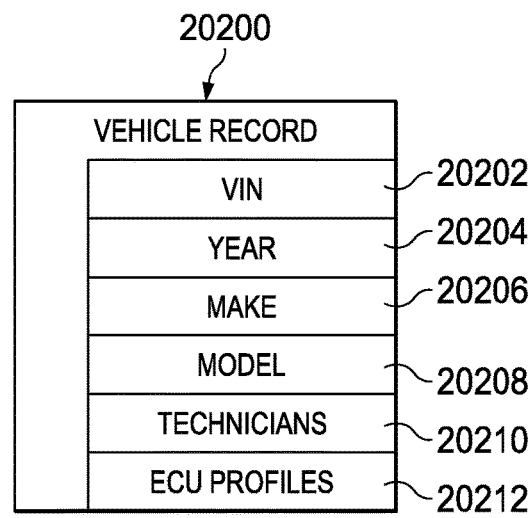

Vehicles 20102 comprise vehicle records 20200 of FIG. 20B that are each associated with a vehicle. Technicians 20104 comprise technician records 20300 that are each associated with a technician. ECU profiles 20106 comprise ECU profile records 20400 that are each associated with an ECU profile.

Referring to FIG. 20B, vehicle record 20200 comprises data and information related to a vehicle. Vehicle identification number (VIN) 20202 is a unique that is assigned to the vehicle by the manufacturer of the vehicle in accordance with international standard ISO 3833. Year 20204 is the model year of the vehicle, which in one embodiment is stored as an unsigned integer. Make 20206 identifies the manufacturer of the vehicle, which in one embodiment is stored as a string of characters in accordance with either the American Standard Code for Information Interchange (ASCII) or Unicode. Model 20208 identifies the model of the vehicle, which in one embodiment is stored as a string of characters. Technicians 20210 are links to technician records 20300 for each technician that has been associated with the vehicle. ECU profiles 20212 are links to ECU profile records 20400 for each ECU profile that has been associated with the vehicle.

Figure 20C:
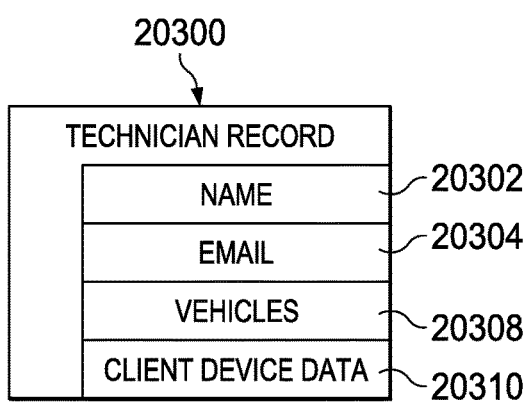

Referring to FIG. 20C, technician record 20300 comprises data and information associated with a technician. Name 20302 is the name of the technician, which in one embodiment is stored as a string of characters. Email 20304 is an email address of the technician that may also serve as a login identifier for the technician and which, in one embodiment, is stored as a string of characters. Vehicles 20308 are links to vehicle records 20200 that are associated with the technician. Client device data 20310 includes data and information about the device that the technician uses to access the system, including: a unique device identifier, operating system (OS) version, client application version, and so on.

Figure 20D:
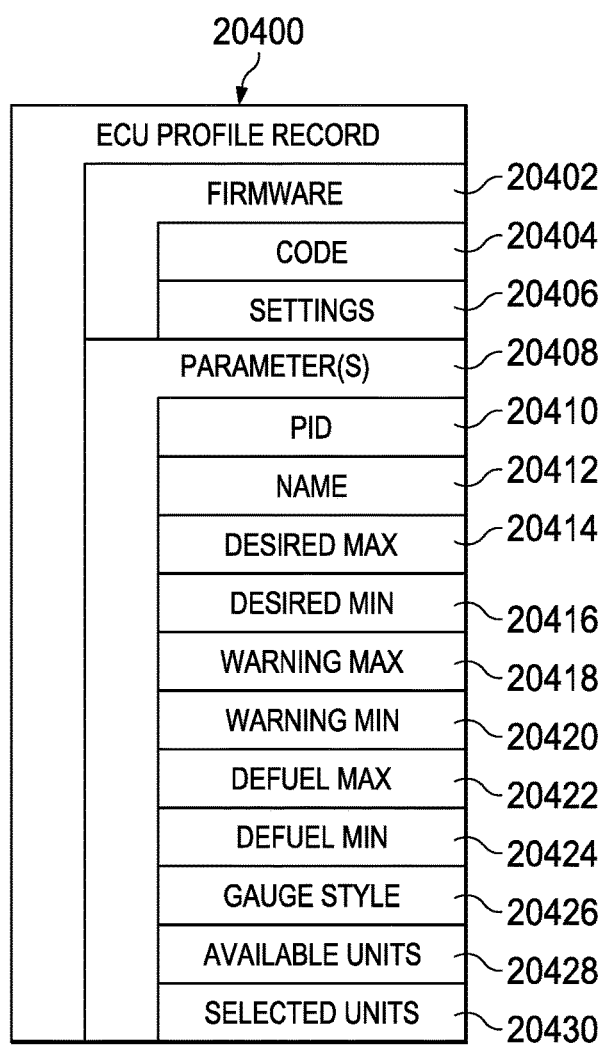

Referring to FIG. 20D, ECU profile record 20400 comprises data and information associated with an ECU profile. ECU profile record 20400 includes firmware 20402 and parameters 20408.

Firmware 20402 is the firmware that runs on an automotive controller, such as automotive controller 114 of FIG. 1. Firmware 20402 includes code 20404 and settings 20406. Code 20404 are the computer code instructions that allow the automotive controller to operate. Settings 20406 are the settings used to tune the engine for efficiency or performance, including settings for ignition timing advance, spark timing, fuel injection, electronic throttle control, poppet valve timing, boost control, an anti-lock braking system, an automatic transmission, a speed governor, an electronic stability control system, and so forth.

Parameters 20408 are the parameters for the gauges displayed on a client device, such as client device 110 of FIG. 1. Parameter identifier (PID) 20410 is a numeric identifier that uniquely identifies the type of data from the automotive controller associated with the parameter. Name 20412 identifies the name of the parameter, which can include: engine coolant temperature, speed, revolutions per minute, battery voltage, transmission temperature, boost, calculated load, injector pressure, injector pulse width, throttle position sensor, and so on. Desired max 20414 is a numerical value that indicates a maximum desired value for the parameter. Desired min 20416 is a numerical value that indicates a minimum desired value for the parameter.

Warning max 20418 is a numerical value that indicates the beginning of an upper warning range. Warning min 20420 is a numerical value that indicates the end of a lower warning range. Continued operation of the vehicle with the values associated with the parameter above warning max 20418 or below warning min 20420 could lead to a breakdown of the engine.

Defuel max 20422 is a numerical value that indicates the threshold above which the vehicle will be defueled to prevent a breakdown. Defuel min 20424 is a numerical value that indicates the threshold below which the vehicle will be defueled to prevent a breakdown.

Gauge style 20426 identifies the style of the gauge that will be used to display the parameter values on the client device.

Available units 20428 is a list of units that can be used to display the values related to parameter 20408. Selected units 20430 identifies which units of available units 20428 will be used to display the values of parameter 20408.

Figure 21:
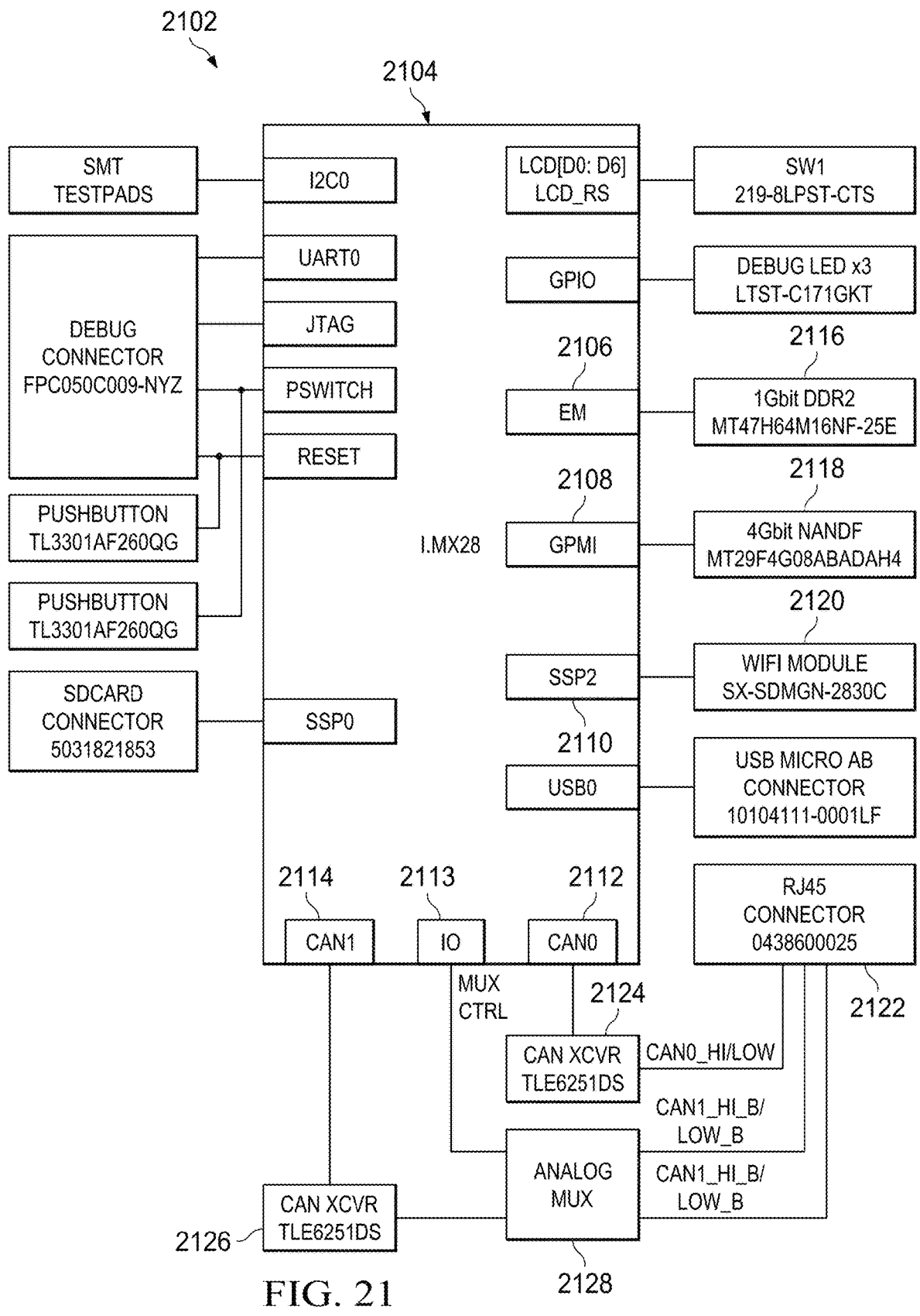
FIG. 21 is a block diagram of a local device of a preferred embodiment.

Referring to FIG. 21, system 2102 is a system within local device 112 of FIG. 1. System 2102 includes application processor 2104 that controls local device 112. System 2102 includes: external memory interface (EMI) 2106, generalpurpose media interface (GPMI) 2108, synchronous serial port (SSP) 2110 and controller area network (CAN) interfaces 2112 and 2114.

EMI 2106 is connected to memory 2116 and GPMI 2108 is connected to memory 2118. In one embodiment, memory 2118 is lower speed persistent memory that stores the programs and data run by application processor 2104 using memory 2116.

SSP 2110 is connected to Wi-Fi module 2120 to allow for wireless communication. In one embodiment, program instructions stored in one or more of memory 2116 and memory 2118 are executed by application processor 2104 so that local device 112 may function as an access point to which a client device can connect.

CAN0 interface 2112 is connected to a first CAN transceiver 2124 of a vehicle via the CAN0_HI/LOW link to connector 2122. CAN1 interface 2114 is connected to a second CAN transceiver 2126 through analog multiplexer 2128 and connector 2122. Analog multiplexer 2128 is connected to connecter 2122 through two CAN1_HI_B/LOW_B lines. Input/Output multiplexor control 2113 is also connected to analog multiplexer 2128. In one embodiment, connector 2122 is an RJ45 connector and an adapter (not shown) is connected between connector 2122 and the on-board diagnostics (OBD) port on the vehicle.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

The invention claimed is:

1. A method of updating an engine control unit (ECU) of a vehicle connected to a network, the network including a local device that is electrically connected to the ECU, a client device connected to the local device, and a server connected to the client device, the method comprising:
    establishing a data connection between the local device and the ECU using a diagnostic port;
    establishing a wireless network connection between the local device and the client device;
    generating, by the client device, a first vehicle data request;
    receiving, at the local device, the first vehicle data request;
    retrieving, by the local device, first vehicle data from the ECU based on the first vehicle data request;
    transmitting, by the local device, the first vehicle data to the client device;
    generating, by the client device, a second vehicle data request;
    receiving, at the local device, the second vehicle data request;
    retrieving, by the local device, second vehicle data from the ECU based on the second vehicle data request;
    wherein the second vehicle data includes at least one parameter for the ECU;
    transmitting, by the local device, the second vehicle data to the client device;
    transmitting, by the client device, a request for updated firmware, to the server;
    receiving, at the client device, updated firmware from the server including a list of a plurality of sets of preconfigured parameters for the ECU;
    displaying, at the client device, the list of the plurality of sets of preconfigured parameters for the ECU;
    making, at the client device, a selection of a set of preconfigured parameters for the ECU from the list of the plurality of sets of preconfigured parameters for the ECU;
    receiving, at the local device, the updated firmware from the client device including the selected set of preconfigured parameters for the ECU; and,
    loading, from the local device, the updated firmware onto the ECU, wherein loading the updated firmware reconfigures at least one parameter for the ECU and the second vehicle data.

2. The method of claim 1, further comprising:
    receiving, at the local device, a parameter identifier (PID) request from the client device;
    recording the PID request in the local device; and,
    receiving, at the local device, PID data from the automotive controller in response to the PID request.

3. The method of claim 2, wherein the PID request relates to one of engine coolant temperature, speed, revolutions per minute, battery voltage, transmission temperature, boost, calculated load, injector pressure, injector pulse width, and throttle position sensor.

4. The method of claim 3, further comprising:
    sending, from the local device, the PID data to the client device, in response to the PID request; and,
    displaying, at the client device, one or more gauges based on the PID data.

5. The method of claim 4, further comprising:
    receiving, at the local device, an engine check request from the client device.

6. The method of claim 5, further comprising:
    retrieving, by the local device, an engine code from the automotive controller; and,
    retrieving, by the local device, frozen data associated with the engine code from the automotive controller.

7. The method of claim 6, further comprising:
    sending, from the local device, a check engine response to the client device that includes the engine code and the frozen data.

8. A method of updating an engine control unit (ECU) of a vehicle connected to a network, the network including a local device connected to the ECU, a client device connected to the local device, a first server connected to the client device, and a second server connected to the first server, the method comprising:
    establishing a network connection between the local device and the ECU;
    establishing a network connection between the local device and the client device;
    generating, by the client device, a first vehicle data request;
    receiving, at the local device, the first vehicle data request;
    retrieving, by the local device, first vehicle data from the ECU based on the first vehicle data request;
    transmitting, by the local device, the first vehicle data to the client device;
    generating, by the client device, a second vehicle data request;
    receiving, at the local device, the second vehicle data request;

retrieving, by the local device, second vehicle data from the ECU based on the second vehicle data request;
wherein the second vehicle data includes at least one parameter for the ECU;
transmitting, by the local device, the second vehicle data to the client device;
transmitting, by the client device, a request for one of updated parameters for the ECU and updated firmware for the ECU, to the first server;
receiving, at the first server, the request from the client device for the one of the updated parameters for the ECU and the updated firmware for the ECU;
receiving, at the second server, the request for the one of the updated parameters for the ECU and the updated firmware for the ECU, from the first server;
receiving, at the first server, the one of the updated parameters for the ECU and the updated firmware for the ECU, from the second server;
sending, from the first server, the one of the updated parameters for the ECU and the updated firmware for the ECU, to the client device;
displaying, at the client device, a list of a plurality of sets of updated parameters for the ECU;
making, at the client device, a selection of a set of updated parameters for the ECU from the list of a plurality of sets of updated parameters for the ECU;
sending, from the client device, one of the selected set of updated parameters for the ECU and the updated firmware for the ECU to the local device; and,
loading, from the local device, the one of the selected set of updated parameters for the ECU and the updated firmware for the ECU, onto the ECU, wherein loading the one of the selected set of updated parameters for the ECU and the updated firmware for the ECU reconfigures at least one of the parameters for the ECU and the second vehicle data.

9. The method of claim 8, further comprising:
sending, from the first server, a request to the second server for the updated firmware for the ECU.

10. The method of claim 9, wherein the client device comprises a first client device, further comprising:
receiving, at the local device, an updated engine setting from the first client device.

11. The method of claim 10, wherein the network further includes a second client device connected to the first client device, further comprising:
receiving, at the second client device, engine data from the first client device after the updated engine setting is loaded to the ECU.

12. A method of updating an engine control unit (ECU) of a vehicle connected to a network, the network including a local device connected to the ECU, a client device connected to the local device, and a system server connected to the client device, the method comprising:
establishing a data connection between the local device and the ECU;
establishing a wireless network connection between the client device and the local device;
generating, by the client device, a first vehicle data request;
receiving, at the local device, the first vehicle data request;
retrieving, by the local device, first vehicle data, from the ECU based on the first vehicle data request;
wherein the first vehicle data includes parameter identifier (PID) data;
transmitting, by the local device, the PID data to the client device;
displaying, on the client device, the PID data received from the local device on a gauge view of a multiple gauge view in a user interface;
generating, by the client device, a second vehicle data request;
receiving, at the local device, the second vehicle data request;
retrieving, by the local device, second vehicle data, from the ECU based on the second vehicle data request;
wherein the second vehicle data includes a parameter for the ECU;
transmitting, by the local device, the second vehicle data, to the client device;
transmitting, by the client device, a request for updated parameters for the ECU, to the system server;
transmitting, from the system server, updated firmware for the ECU including a plurality of sets of preconfigured operating system (OS) parameters for the ECU;
receiving, at the client device, a response from the system server that includes the updated firmware for the ECU;
displaying, at the client device, a list of the one or more sets of preconfigured OS parameters for the ECU;
making, at the client device, a selection of a set of preconfigured OS parameters for the ECU from the list of the one or more sets of preconfigured OS parameters for the ECU;
sending, by the client device, the updated firmware for the ECU to the local device including the selected set of preconfigured OS parameters for the ECU; and,
loading, from the local device, the updated firmware for the ECU onto the ECU, wherein loading the updated firmware for the ECU reconfigures at least one of the OS parameters for the ECU and the second vehicle data.

13. The method of claim 12, further comprising:
sending, by the client device, a PID request to the local device for the PID data.

14. The method of claim 13, further comprising:
receiving, at the client device, the PID data from the local device, in response to the PID request and after the PID request is recorded by the local device.

15. The method of claim 14, further comprising:
sending, from the client device, an engine check request to the local device.

16. The method of claim 15, further comprising:
receiving, at the client device, an engine check response from the local device.

17. The method of claim 16, wherein the engine check response comprises an engine code and frozen data associated with the engine code.

18. The method of claim 17, further comprising:
displaying, on the client device, the engine code.

19. The method of claim 18, further comprising:
sending, from the client device, the engine code and the frozen data to the system server;
sending, from the client device, a request for corrective firmware for the ECU to the system server based on the engine code;
storing the corrective firmware for the ECU on the client device;
sending, by the client device, the corrective firmware for the ECU to the local device; and,
sending, by the local device, the corrective firmware for the ECU to the ECU.

20. The method of claim 7, further comprising:
sending, from the client device, the engine code and the frozen data to the server;
sending, from the client device, a request for corrective firmware for the ECU to the server based on the engine code;
storing the corrective firmware for the ECU on the client device;
sending, by the client device, the corrective firmware for the ECU to the local device; and,
sending, by the local device, the corrective firmware for the ECU to the ECU.

21. The method of claim 8, further comprising:
receiving, at the local device, an engine check request from the client device;
retrieving, by the local device, an engine code from the automotive controller;
retrieving, by the local device, frozen data associated with the engine code from the automotive controller;
sending, from the local device, a check engine response to the client device that includes the engine code and the frozen data;
sending, from the client device, the engine code and the frozen data to the first server;
sending, from the client device, a request for corrective firmware for the ECU to the first server based on the engine code;
storing the corrective firmware for the ECU on the client device;
sending, by the client device, the corrective firmware for the ECU to the local device; and,
sending, by the local device, the corrective firmware for the ECU to the ECU.

22. A method of updating an engine control unit (ECU) of a vehicle connected to a network, the network including a local device connected to the ECU, a client device connected to the local device, and a system server connected to the client device, the method comprising:
establishing a data connection between the local device and the ECU;
establishing a wireless network connection between the client device and the local device;
generating, by the client device, a first vehicle data request;
receiving, at the local device, the first vehicle data request;
retrieving, by the local device, first vehicle data, from the ECU based on the first vehicle data request;
wherein the first vehicle data includes parameter identifier (PID) data;
transmitting, by the local device, the PID data to the client device;
displaying, on the client device, the PID data received from the local device on a gauge view of a multiple gauge view in a user interface;
generating, by the client device, a second vehicle data request;
receiving, at the local device, the second vehicle data request;
retrieving, by the local device, second vehicle data, from the ECU based on the second vehicle data request;
wherein the second vehicle data includes an ECU parameter;
transmitting, by the local device, the second vehicle data, to the client device;
transmitting, by the client device, a request for updated parameters, to the system server;
transmitting, from the system server, updated firmware including one or more sets of preconfigured ECU operating system (OS) parameters;
receiving, at the client device, a response from the system server that includes the updated firmware;
displaying, at the client device, a list of the one or more sets of preconfigured ECU OS parameters;
making, at the client device, a selection of a set of preconfigured ECU OS parameters from the list of the one or more sets of preconfigured ECU OS parameters;
sending, by the client device, the updated firmware to the local device including the selected set of preconfigured ECU OS parameters;
loading, from the local device, the updated firmware onto the ECU, wherein loading the updated firmware reconfigures at least one of the ECU parameter and the second vehicle data;
sending, by the client device, a PID request to the local device for the PID data;
receiving, at the client device, the PID data from the local device after the PID request is recorded by the local device;
sending, from the client device, an engine check request to the local device;
receiving, at the client device, an engine check response from the local device wherein the engine check response comprises an engine code and frozen data associated with the engine code;
displaying, on the client device, the engine code;
sending, from the client device, the engine code and the frozen data to the system server;
sending, from the client device, a request for corrective firmware to the system server based on the engine code;
storing the corrective firmware on the client device;
sending, by the client device, the corrective firmware to the local device;
sending, by the local device, the corrective firmware to the ECU;
linking to a plurality of technician records for each technician that has been associated with the vehicle;
sending, by a client device app, a log of information recorded by client device to a contact identified in a user interface element;
updating specific engine tuning parameters to values received from the local device tuned for a specific configuration of the vehicle; and,
reducing fuel supply to an engine of the vehicle to protect the engine when a revolutions per minute PID is below a minimum desired threshold or above a maximum desired threshold.

* * * * *